US012568564B2

(12) United States Patent
Kuta et al.

(10) Patent No.: US 12,568,564 B2
(45) Date of Patent: Mar. 3, 2026

(54) PORTABLE LIGHTING DEVICE WITH AUTOMATIC DIMMING FUNCTIONALITY

(71) Applicant: MILWAUKEE ELECTRIC TOOL CORPORATION, Brookfield, WI (US)

(72) Inventors: Jonathan Kuta, Milwaukee, WI (US); Bennett W. Westling, Milwaukee, WI (US); Li Zhang, Dongguan (CN); Hao Cui, Dongguan (CN); Dan Jun Guo, Dongguan (CN); Hai Chang Jiang, Dongguan (CN); Lin Lei, Dongguan (CN); Bo Dong, Shenzhen (CN); Bin Li, Shenzhen (CN); Xu Guang Deng, Shenzhen (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 620 days.

(21) Appl. No.: 17/998,692

(22) PCT Filed: May 19, 2021

(86) PCT No.: PCT/US2021/033201

§ 371 (c)(1),
(2) Date: Nov. 14, 2022

(87) PCT Pub. No.: WO2021/236796

PCT Pub. Date: Nov. 25, 2021

(65) Prior Publication Data

US 2023/0354495 A1 Nov. 2, 2023

(30) Foreign Application Priority Data

May 22, 2020 (CN) ......................... 202010439818.9

(51) Int. Cl.
*H05B 47/11* (2020.01)
*F21V 21/084* (2006.01)
(Continued)

(52) U.S. Cl.
CPC ............ *H05B 47/11* (2020.01); *F21V 21/084* (2013.01); *H05B 45/10* (2020.01); *H05B 45/325* (2020.01); *H05B 47/17* (2020.01); *F21Y 2115/10* (2016.08)

(58) Field of Classification Search
CPC ...... H05B 47/11; H05B 45/10; H05B 45/325; H05B 47/17; F21V 21/084; F21Y 2115/10; Y02B 20/40
See application file for complete search history.

(56) References Cited

U.S. PATENT DOCUMENTS 6,053,936 A 4/2000 Koyama et al.
6,160,352 A 12/2000 Steinel
(Continued)

FOREIGN PATENT DOCUMENTS

CN 201810995 U 4/2011
CN 102661590 A 9/2012
(Continued)

OTHER PUBLICATIONS

Extended European Search Report for Application No. 21809127.0 dated Apr. 24, 2024 (18 pages).
(Continued)

*Primary Examiner* — Minh Tran
(74) *Attorney, Agent, or Firm* — Michael Best & Friedrich LLP

(57) ABSTRACT

Systems and methods are provided for calculating, using an electronic processor, an average environmental brightness and determining a current pulse width modulation ("PWM") output level provided to the light source. The method also includes determining, using the electronic processor, a target
(Continued)

illumination level and a PWM adjustment rate. The PWM adjustment rate is based at least partially on the calculated average environmental brightness. The method also includes adjusting, using the electronic processor, the current PWM output level at the determined PWM adjustment rate to reach the target illumination level, and transmitting the adjusted PWM output level to the light source. The target illumination level is determined as a function of the current PWM output level and an output mode of the light source.

21 Claims, 13 Drawing Sheets

(51) Int. Cl.

| | |
|---|---|
| ***H05B 45/10*** | (2020.01) |
| ***H05B 45/325*** | (2020.01) |
| ***H05B 47/17*** | (2020.01) |
| *F21Y 115/10* | (2016.01) |

(56) References Cited

U.S. PATENT DOCUMENTS

| | | | | |
|---|---|---|---|---|
| 6,362,578 | B1 | 3/2002 | Swanson et al. | |
| 6,836,081 | B2 | 12/2004 | Swanson et al. | |
| 6,966,668 | B2 | 11/2005 | Cugini et al. | |
| 7,008,074 | B1 | 3/2006 | Halm | |
| 7,339,471 | B1 | 3/2008 | Chan et al. | |
| 7,638,747 | B2 | 12/2009 | Fujie | |
| 7,812,550 | B2 | 10/2010 | Harmgardt et al. | |
| 8,004,210 | B2 | 8/2011 | Harmgardt et al. | |
| 8,033,677 | B1 | 10/2011 | Olsson et al. | |
| 8,282,250 | B1 | 10/2012 | Dassanayake et al. | |
| 8,297,791 | B2 | 10/2012 | Kuang et al. | |
| 8,378,587 | B2 | 2/2013 | Huguenin et al. | |
| 8,400,061 | B2 | 3/2013 | Kuang et al. | |
| 8,466,625 | B2 | 6/2013 | Wu et al. | |
| 8,632,230 | B2 | 1/2014 | Olsson et al. | |
| 8,648,550 | B2 | 2/2014 | Staab | |
| 8,674,626 | B2 | 3/2014 | Siemiet et al. | |
| 8,786,191 | B2 | 7/2014 | Kuang et al. | |
| 8,853,952 | B2 | 10/2014 | McCavit et al. | |
| 8,890,420 | B2 | 11/2014 | Bradford | |
| 8,933,632 | B2 | 1/2015 | Panaccio | |
| 8,979,304 | B2 | 3/2015 | Mart et al. | |
| 9,084,314 | B2 | 7/2015 | Conover et al. | |
| 9,096,168 | B2 | 8/2015 | Kuang et al. | |
| 9,125,269 | B2 | 9/2015 | Knoedgen et al. | |
| 9,137,873 | B2 | 9/2015 | Bradford | |
| 9,185,777 | B2 | 11/2015 | Reed | |
| 9,215,775 | B1 | 12/2015 | Lunn et al. | |
| 9,249,964 | B2 | 2/2016 | Hansen et al. | |
| 9,271,343 | B2 | 2/2016 | Mackool et al. | |
| 9,388,973 | B1 | 7/2016 | Olsson et al. | |
| 9,414,460 | B2 | 8/2016 | Bender et al. | |
| 9,425,649 | B2 | 8/2016 | Singer et al. | |
| 9,469,241 | B2 | 10/2016 | Genthon et al. | |
| 9,591,711 | B2 | 3/2017 | Lunn et al. | |
| 9,591,726 | B2 | 3/2017 | Harbers et al. | |
| 9,596,737 | B2 | 3/2017 | Harbers | |
| 9,608,479 | B2 | 3/2017 | Singer et al. | |
| 9,609,722 | B2 | 3/2017 | Law | |
| 9,648,692 | B2 | 5/2017 | Bortolotti et al. | |
| 9,686,838 | B2 | 6/2017 | Elwell et al. | |
| 9,693,425 | B2 | 6/2017 | Feustel et al. | |
| 9,702,619 | B2 | 7/2017 | Kendall et al. | |
| 9,713,226 | B2 | 7/2017 | Bradford | |
| 9,726,356 | B2 | 8/2017 | Ormsbee et al. | |
| 9,730,294 | B2 | 8/2017 | Roberts | |
| 9,746,167 | B2 | 8/2017 | Weeks et al. | |
| 9,756,693 | B1 | 9/2017 | Klyn et al. | |
| 9,791,138 | B1 | 10/2017 | Feinbloom et al. | |
| 9,795,009 | B2 | 10/2017 | Law | |
| 9,839,093 | B1 | 12/2017 | Blanchard et al. | |
| 9,839,206 | B2 | 12/2017 | Lawyer et al. | |
| 9,872,361 | B1 | 1/2018 | Ammari et al. | |
| 9,955,540 | B1 | 4/2018 | Blanchard | |
| 9,968,153 | B2 | 5/2018 | Thompson et al. | |
| 9,999,112 | B2 | 6/2018 | Weeks et al. | |
| 10,012,372 | B2 | 7/2018 | Marie et al. | |
| 10,021,756 | B2 | 7/2018 | Bradford et al. | |
| 10,066,818 | B2 | 9/2018 | Ormsbee et al. | |
| 10,070,503 | B2 | 9/2018 | Harbers et al. | |
| 10,078,055 | B2 | 9/2018 | Nichols et al. | |
| 10,091,854 | B1 | 10/2018 | Brandon, II | |
| 10,123,395 | B2 | 11/2018 | Harbers | |
| 10,174,932 | B2 | 1/2019 | Rosenblum | |
| 10,230,262 | B2 | 3/2019 | Singer et al. | |
| 10,356,881 | B2 | 7/2019 | Harbers et al. | |
| 10,925,128 | B2 | 2/2021 | Zhang et al. | |
| 2005/0099799 | A1 | 5/2005 | Cugini et al. | |
| 2006/0132323 | A1 | 6/2006 | Grady, Jr. | |
| 2007/0194718 | A1 | 8/2007 | Foo | |
| 2008/0129206 | A1 | 6/2008 | Stam et al. | |
| 2008/0219206 | A1 | 9/2008 | Agarwal et al. | |
| 2010/0123820 | A1 | 5/2010 | Tsai | |
| 2011/0289658 | A1 | 12/2011 | Knoepfli et al. | |
| 2012/0116632 | A1* | 5/2012 | Bechtel | H04N 25/443 701/1 |
| 2012/0200225 | A1* | 8/2012 | Sawada | H05B 47/11 315/151 |
| 2012/0298866 | A1 | 11/2012 | Stevens | |
| 2013/0221859 | A1 | 8/2013 | Pavelchak | |
| 2014/0184082 | A1 | 7/2014 | Siemiet et al. | |
| 2014/0375216 | A1 | 12/2014 | Seidmann | |
| 2015/0077016 | A1 | 3/2015 | Panaccio | |
| 2015/0158421 | A1 | 6/2015 | Kuang et al. | |
| 2016/0076728 | A1 | 3/2016 | Feng et al. | |
| 2016/0185288 | A1 | 6/2016 | Kuang et al. | |
| 2016/0234907 | A1* | 8/2016 | Joseph | H05B 45/46 |
| 2017/0050560 | A1 | 2/2017 | Kuang et al. | |
| 2017/0115052 | A1 | 4/2017 | Kendall et al. | |
| 2017/0146205 | A1 | 5/2017 | Laforte | |
| 2017/0156185 | A1 | 6/2017 | Zhou et al. | |
| 2017/0223787 | A1 | 8/2017 | Siemiet et al. | |
| 2018/0110280 | A1 | 4/2018 | Patel et al. | |
| 2018/0184628 | A1 | 7/2018 | Lawyer et al. | |
| 2018/0242673 | A1 | 8/2018 | Thompson et al. | |
| 2019/0297693 | A1 | 9/2019 | Siemiet et al. | |

FOREIGN PATENT DOCUMENTS

| | | | |
|---|---|---|---|
| CN | 203348930 | U | 12/2013 |
| CN | 203395639 | U | 1/2014 |
| CN | 104012178 | A | 8/2014 |
| CN | 105042350 | A | 11/2015 |
| CN | 205137139 | U | 4/2016 |
| CN | 105736987 | A | 7/2016 |
| CN | 106090689 | A | 11/2016 |
| CN | 206036733 | U | 3/2017 |
| CN | 106658906 | A | 5/2017 |
| CN | 106804081 | A | 6/2017 |
| CN | 206260109 | U | 6/2017 |
| CN | 206268858 | U | 6/2017 |
| CN | 107041054 | A | 8/2017 |
| CN | 107277971 | A | 10/2017 |
| CN | 107660042 | A | 2/2018 |
| CN | 107864539 | A | 3/2018 |
| CN | 108548104 | A | 9/2018 |
| CN | 108954224 | A | 12/2018 |
| CN | 208687417 | U | 4/2019 |
| DE | 102008053910 | A1 | 5/2010 |
| DE | 102015009097 | A1 | 1/2017 |
| EP | 0948242 | A1 | 10/1999 |
| EP | 0744882 | B1 | 7/2001 |
| EP | 1959715 | A1 | 8/2008 |
| EP | 2690344 | B1 | 5/2015 |
| EP | 2894947 | A1 | 7/2015 |
| JP | H09145468 | A | 6/1997 |
| JP | 3874030 | B2 | 1/2007 |
| JP | 2010177136 | A | 8/2010 |

(56) References Cited

FOREIGN PATENT DOCUMENTS

| | | | |
|---|---|---|---|
| JP | 2011009080 | A | 1/2011 |
| WO | 2012045555 | A1 | 4/2012 |

OTHER PUBLICATIONS

Chinese Patent Office Action for Application No. 202010439818.9 dated Sep. 9, 2023 (12 pages including machine English translation).

International Search Report and Written Opinion for Application No. PCT/US2021/033201 dated Sep. 6, 2021 (10 pages).

* cited by examiner

PORTABLE LIGHTING DEVICE WITH AUTOMATIC DIMMING FUNCTIONALITY

CROSS-REFERENCE TO RELATED APPLICATIONS

This application is a national stage filing under 35 U.S.C. § 371 of International Application No. PCT/US2021/033201 filed on May 19, 2021, which claims foreign priority to Chinese Patent Application No. 202010439818.9 filed on May 22, 2020, the entire contents of which are incorporated herein by reference.

TECHNICAL FIELD

The present invention relates to lighting devices. More specifically, the present invention relates to portable lighting devices having adjustable light outputs.

SUMMARY

In a first aspect, a method is provided for automatically dimming a light source. The method includes calculating, using an electronic processor, an average environmental brightness and determining a current pulse width modulation ("PWM") output level provided to the light source. The method also includes determining, using the electronic processor, a target illumination level and a PWM adjustment rate. The PWM adjustment rate is based at least partially on the calculated average environmental brightness. The method also includes adjusting, using the electronic processor, the current PWM output level at the determined PWM adjustment rate to reach the target illumination level, and transmitting the adjusted PWM output level to the light source. The target illumination level is determined as a function of the current PWM output level and an output mode of the light source.

In one embodiment of the first aspect, determining the PWM adjustment rate comprises: determining, using the electronic processor, whether a difference between the calculated average environmental brightness and the target illumination level is greater than a first predetermined illumination value; setting, using the electronic processor, the PWM adjustment rate to a first adjustment rate value based on the difference between the calculated average environmental brightness and the target illumination level being greater than the first predetermined illumination value; determining, using the electronic processor, in response to the difference between the calculated average environmental brightness and the target illumination level not being greater than the first predetermined illumination value, whether the difference between the calculated average environmental brightness and the target illumination level is greater than a second predetermined illumination value, the second predetermined illumination value is less than the first predetermined illumination value; and setting, using the electronic processor, the PWM adjustment rate to a second adjustment rate value based on the difference between the calculated average environmental brightness and the target illumination level being greater than the second predetermined illumination value, the second adjustment rate value being different than the first adjustment rate value.

In one embodiment of the first aspect, the second adjustment rate value is a lower rate of change than the first adjustment rate value.

In one embodiment of the first aspect, determining the PWM adjustment rate further comprises: determining, using the electronic processor, in response to the difference between the calculated average environmental brightness and the target illumination level not being greater than the second predetermined illumination value, whether the difference between the calculated average environmental brightness and the target illumination level is greater than a third predetermined illumination value, the third predetermined illumination value is less than the second predetermined illumination value; setting, using the electronic processor, the PWM adjustment rate to a third adjustment rate value based on the difference between the calculated average environmental brightness and the target illumination level being greater than the third predetermined illumination value, the third adjustment rate value is a lower rate of change than the second adjustment rate value; determining, using the electronic processor, in response to the difference between the calculated average environmental brightness and the target illumination level not being greater than the third predetermined illumination value, whether the difference between the calculated average environmental brightness and the target illumination level is greater than a fourth predetermined illumination value, the fourth predetermined illumination value is less than the third predetermined illumination value; and setting, using the electronic processor, the PWM adjustment rate to a fourth adjustment rate value based on the difference between the calculated average environmental brightness and the target illumination level being greater than the fourth predetermined illumination value, the fourth adjustment rate value is a lower rate of change than the third adjustment rate value.

In one embodiment of the first aspect, determining the PWM adjustment rate further comprises: determining, using the electronic processor, in response to the difference between the calculated average environmental brightness and the target illumination level not being greater than the fourth predetermined illumination value, whether the difference between the calculated average environmental brightness and the target illumination level is greater than a fifth predetermined illumination value, the fifth predetermined illumination value is less than the fourth predetermined illumination value; and setting, using the electronic processor, the PWM adjustment rate to a fifth adjustment rate value based on the difference between the calculated average environmental brightness and the target illumination level being greater than the fifth predetermined illumination value, the fifth adjustment rate value is a lower rate of change than the fourth adjustment rate value.

In one embodiment of the first aspect, the light source includes one or more light emitting diodes.

In one embodiment of the first aspect, calculating the average environmental brightness comprises: measuring an environmental brightness level using a light sensor; sampling, using the electronic processor, the measured environmental brightness level; storing, in a memory coupled to the electronic processor, the sampled environmental brightness level in an array; recording a position of the sampled environmental brightness level in the array as a first position; determining, using the electronic processor, a first peak data value within the array, the first peak data value occurred prior to the sampled environmental brightness level; and recording, using the electronic processor, a position of the determined first peak data value in the array as a second position.

In one embodiment of the first aspect, calculating the average environmental brightness further comprises: determining, using the electronic processor, a second peak data value within the array, the second peak data value occurred prior to the first peak data value; recording, using the electronic processor, a position of the determined second peak data value in the array as a third position; determining, using the electronic processor, a third peak data value within the array, the third peak data value occurred prior to the second peak data value; and recording, using the electronic processor, a position of the determined third peak data value in the array as a fourth position.

In one embodiment of the first aspect, calculating the average environmental brightness further comprises: determining, using the electronic processor, whether a number of sampled data points between the first position and the second position is greater than a first number of sampled data points; calculating, using the electronic processor, the average environmental brightness using a first set of sampling data elements based on determining that the number of sampled data points between the first position and the second position is greater than the first number of sampled data points; determining, using the electronic processor, based on the number of sampled data points between the first position and the second position not being greater than the first number of sampled data points, whether a number of sampled data points between the second position and the third position is within a range bounded by the first number of sampled data points and a second number of sampled data points, the second number of sampled data points is less than the first number of sampled data points; and calculating, using the electronic processor, the average environmental brightness using a second set of sampling data elements based on the number of sampled data points between the second position and the third position not being within a range bounded by the first number of sampled data points and the second number of sampled data points.

In one embodiment of the first aspect, calculating the average environmental brightness further comprises: determining, using the electronic processor, based on the number of sampled data points between the second position and the third position being within a range bounded by the first number of sampled data points and the second number of sampled data points, whether a number of sampled data points between the fourth position and the third position is within a range bounded by the first number of sampled data points and a third number of sampled data points, the third number of sampled data points is less than the second number of sampled data points; calculating, using the electronic processor, the average environmental brightness using a third set of sampling data elements based on the number of sampled data points between the fourth position and the third position being within the range bounded by the first number of sampled data points and the third number of sampled data points; and calculating, using the electronic processor, the average environmental brightness using a fourth set of sampling data elements based on the number of sampled data points between the third position and the fourth position not being within the range bounded by the first number of sampled data points and the third number of sampled data points.

In one embodiment of the first aspect, the first set of sampling data elements comprises 16 data elements immediately sampled prior to the sampled environmental brightness level.

In one embodiment of the first aspect, the second set of sampling data elements comprises 64 data elements immediately sampled prior to the sampled environmental brightness level.

In one embodiment of the first aspect, the third set of sampling data elements comprises all data elements in the array between the second position and the fourth position.

In one embodiment of the first aspect, the fourth set of sampling data elements comprises all data elements in the array between the second position and the third position.

In a second aspect, a lighting device is provided. The lighting device includes one or more lighting elements, an ambient light sensor, and an electronic processor in communication with a memory. The electronic processor is configured to calculate an average environmental brightness, and determine a current pulse width modulation ("PWM") output level provided to the one or more lighting elements. The electronic processor is further configured to determine a target illumination level and a PWM adjustment rate. The PWM adjustment rate is based at least partially on the calculated average environmental brightness. The electronic processor is further configured to adjust the current PWM output level at the determined PWM adjustment rate to reach the target illumination level, and transmit the adjusted PWM output level to the one or more lighting elements based on the target illumination level to control an output of the one or more lighting elements. The target illumination level is determined as a function of the current PWM output level and an output mode of the one or more lighting elements.

In one embodiment of the second aspect, the electronic processor is further configured to: determining, using the electronic processor, whether a difference between the calculated average environmental brightness and the target illumination level is greater than a first predetermined illumination value; set the PWM adjustment rate to a first adjustment rate value based on the difference between the calculated average environmental brightness and the target illumination level being greater than the first predetermined illumination value; determine, in response to the difference between the calculated average environmental brightness and the target illumination level not being greater than the first predetermined illumination value, whether the difference between the calculated average environmental brightness and the target illumination level is greater than a second predetermined illumination value, the second predetermined illumination value is less than the first predetermined illumination value; and set the PWM adjustment rate to a second adjustment rate value based on the difference between the calculated average environmental brightness and the target illumination level being greater than the second predetermined illumination value, the second adjustment rate value being different than the first adjustment rate value.

In one embodiment of the second aspect, the lighting device further comprises an automatic dimming mode selector switch configured to allow a user to provide an input to the electronic processor to maintain a constant lighting level regardless of the average environmental brightness.

In one embodiment of the second aspect, the lighting device is a headlamp.

In a third aspect, a method is presented for automatically dimming a light source based on an environmental lighting level. The method includes calculating, using an electronic processor an average environmental brightness. The method also includes determining, using the electronic processor, a current pulse width modulation ("PWM") output level provided to the light source, a target illumination level, and a PWM adjustment rate. Determining the PWM adjustment rate includes determining, using the electronic processor, whether a difference between the calculated average environmental brightness and the target illumination level is greater than a first predetermined illumination value. Determining the PWM adjustment rate also includes setting, using the electronic processor, the PWM adjustment rate to a first adjustment rate value based on the difference between the calculated average environmental brightness and the target illumination level being greater than the first predetermined illumination value. Determining the PWM adjustment rate also includes, determining, using the electronic processor, in response to the difference between the calculated average environmental brightness and the target illumination level not being greater than the first predetermined illumination value, whether the difference between the calculated average environmental brightness and the target illumination level is greater than a second predetermined illumination value. The second predetermined illumination value is less than the first predetermined illumination value. Determining the PWM adjustment rate also includes setting, using the electronic processor, the PWM adjustment rate to a second adjustment rate value based on the difference between the calculated average environmental brightness and the target illumination level being greater than the second predetermined illumination value. The method further includes adjusting, using the electronic processor, the current PWM output level at the determined PWM adjustment rate to reach the target illumination level, and transmitting, using the electronic processor, the adjusted PWM output level to one or more lighting elements of the light source to control an output of the one or more lighting elements.

In one embodiment of the third aspect, determining the PWM adjustment rate further comprises: determining, using the electronic processor, in response to the difference between the calculated average environmental brightness and the target illumination level not being greater than the second predetermined illumination value, whether the difference between the calculated average environmental brightness and the target illumination level is greater than a third predetermined illumination value, the third predetermined illumination value is less than the second predetermined illumination value; setting, using the electronic processor, the PWM adjustment rate to a third adjustment rate value based on the difference between the calculated average environmental brightness and the target illumination level being greater than the third predetermined illumination value, the third adjustment rate value is a lower rate of change than the second adjustment rate value; determining, using the electronic processor, in response to the difference between the calculated average environmental brightness and the target illumination level not being greater than the third predetermined illumination value, whether the difference between the calculated average environmental brightness and the target illumination level is greater than a fourth predetermined illumination value, the fourth predetermined illumination value is less than the third predetermined illumination value; and setting, using the electronic processor, the PWM adjustment rate to a fourth adjustment rate value based on the difference between the calculated average environmental brightness and the target illumination level being greater than the fourth predetermined illumination value, the fourth adjustment rate value is a lower rate of change than the third adjustment rate value.

DETAILED DESCRIPTION

Before any embodiments of the invention are explained in detail, it is to be understood that the application is not limited to the details of construction and the arrangement of components set forth in the following description or illustrated in the following drawings. The application is capable of other embodiments and of being practiced or of being carried out in various ways. For example, in the flowcharts depicting processes, not all of the blocks need to be performed or need to be performed in the order presented. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly to encompass both direct and indirect mountings, connections, supports, and couplings.

Figure 1A:
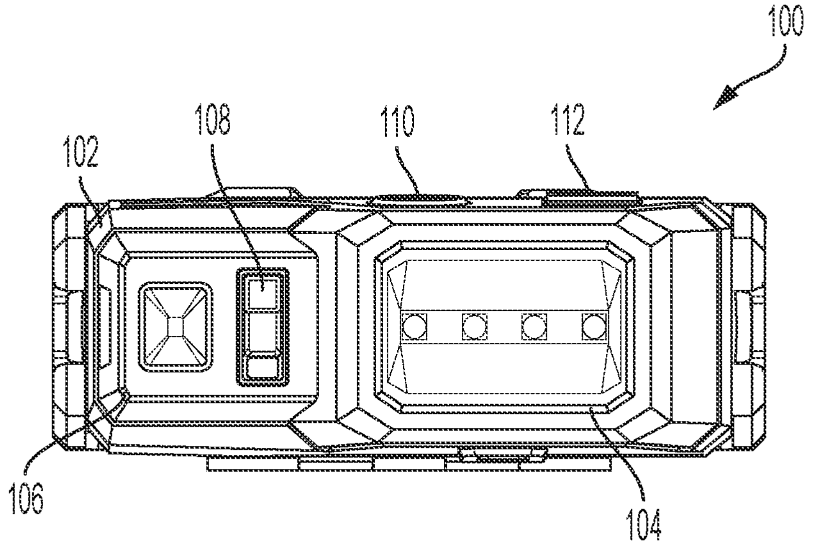
FIG. 1A is a front view of a portable lighting device including a light source, according to some embodiments.

FIG. 1A is a front view illustrating a portable lighting device 100, such as a personal headlamp. While the embodiments described herein are directed to a headlamp device, it is understood that other personal lighting devices, such as flashlights, floodlights, work lights, etc. are also contemplated. The portable lighting device 100 includes a housing 102. The housing 102 has a generally elongated cuboidal shape with a rectangular or square cross-section. In other embodiments, the housing 102 may be configured as other geometric shapes. The housing 102 supports and encloses the other components of the lighting device 100. The illustrated portable lighting device 100 also includes a light source 104, an ambient light sensor 106, an automatic dimming mode selector 108, a power button 110 and a mode selector 112.

Figure 1B:
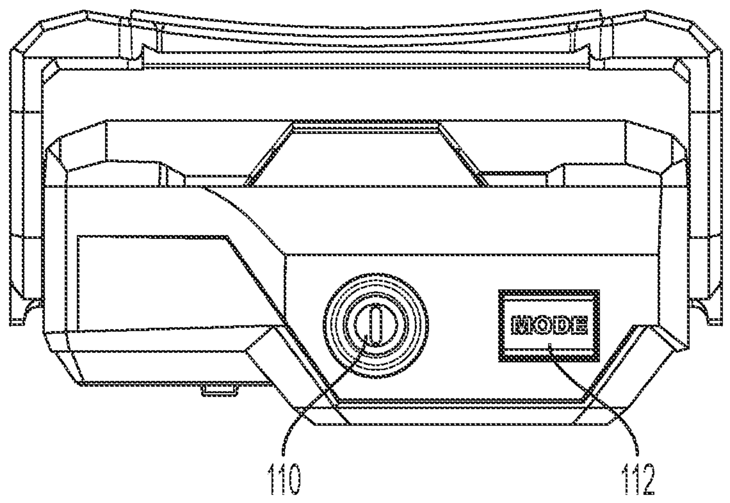
FIG. 1B is a top-down view of a headlamp lighting device including a light source, according to some embodiments.
Figure 1C:
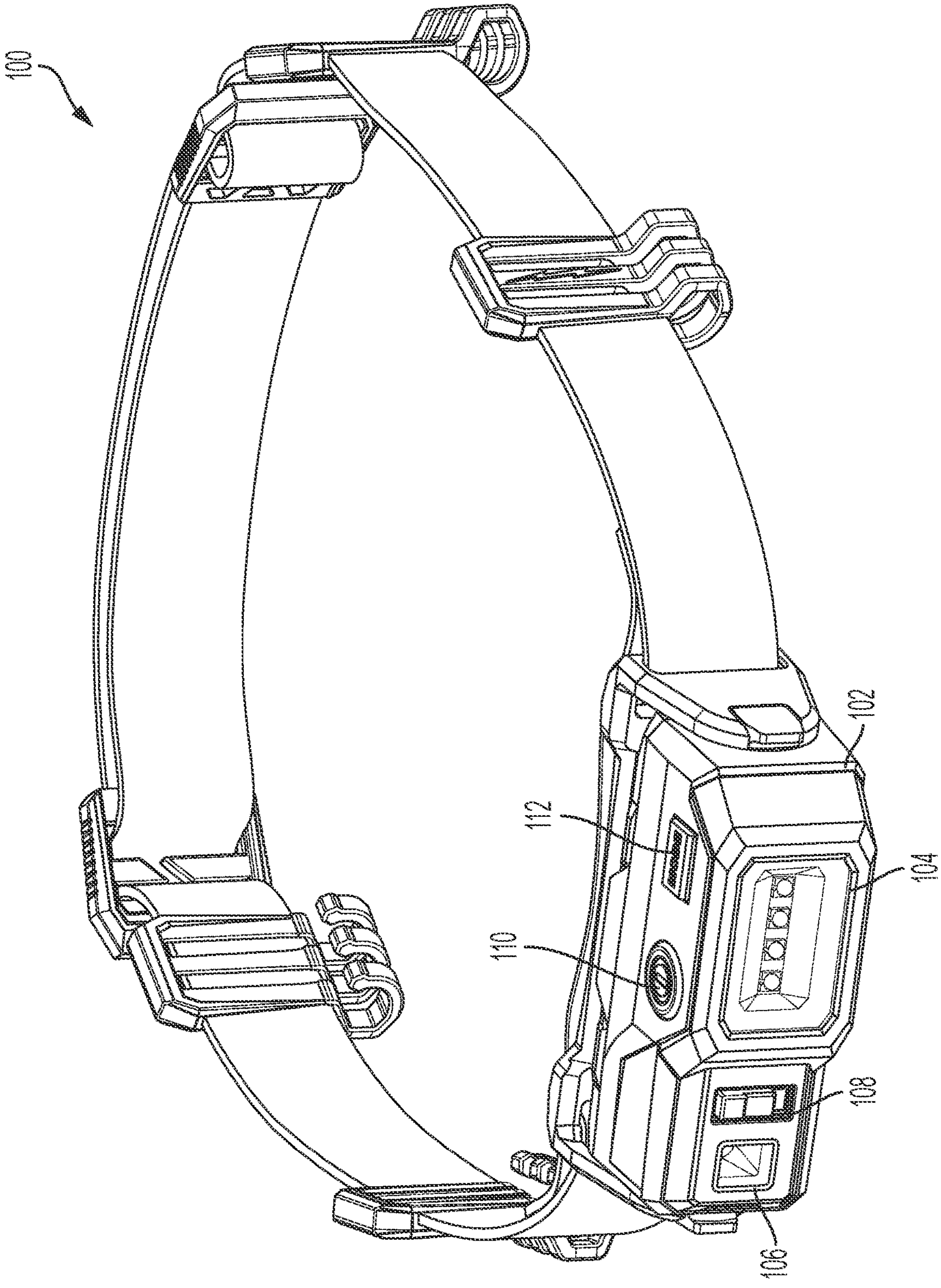
FIG. 1C is a perspective view of a headlamp lighting device, according to some embodiments.

FIG. 1B is a top-down view of the portable lighting device 100, and more clearly illustrates the power button 110 and the mode selector 112. FIG. 1C is a perspective view of the portable lighting device 100. As shown in FIG. 1C, the portable lighting device 100 is coupled to an adjustable strap 114 for wearing on the head or hard hat (or other head covering) of a user. The above embodiments described in FIGS. 1A, 1B, and 1C are for example purposes only, and it is contemplated that other portable lighting device types may be used to effectuate the below processes. Other example portable lighting device types can include headlamps, flashlights, flood lights, tower lights, site lights, temporary lights, and the like.

In some embodiments, the light sources 104 may include one or more light emitting elements. In one embodiment, the light emitting elements are light emitting diodes (LEDs). The light sources 104 may include various numbers of LEDs. In one example, the light sources 104 may include 1, 2, 4, or any other number of LEDs. For example, in some embodiments, the lighting device 100 may be a personal flashlight that only includes one LED. In other examples, the lighting device 100 may be a tower light that includes 50 or more LEDs. In the present embodiments, the LEDs are driven in synchronism with a relatively constant current or voltage applied to each of the LEDs. In other embodiments, the LEDs may be driven separately and with a variable current or voltage. The illustrated light source 104 may include one or more spot-type LEDs. Additionally or alternatively, the light source 104 may include one or more flood-type LEDs. In some embodiments, the light source 104 may include both a spot-type LED and a flood-type LED that are able to be operated independently and/or in combination.

Figure 2:
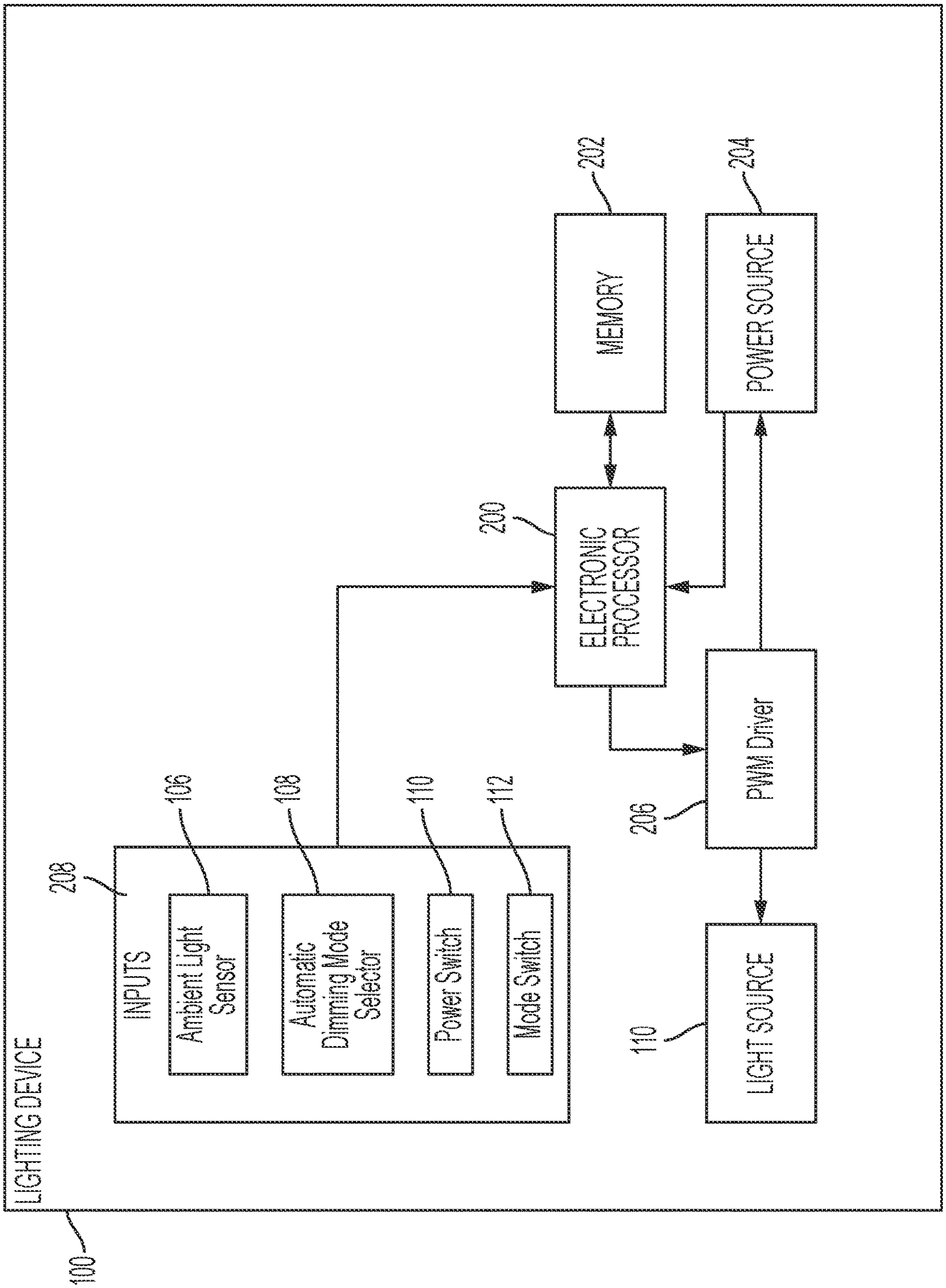
FIG. 2 is a block diagram of a lighting device, according to some embodiments.

Turning now to FIG. 2, a block diagram of the lighting device 100 is shown, according to one embodiment. As shown in FIG. 2, the lighting device 100 includes an electronic processor 200, a memory 202, a power source 204, a pulse width modulation ("PWM") driver 206, one or more inputs 208, and the light source 104. The electronic processor 200 is electrically coupled to a variety of components of the lighting device 100 and includes electrical and electronic components that provide power, operational control, and protection to the components of the lighting device 100. In some embodiments, the electronic processor 200 includes, among other things, a processing unit (e.g., a microprocessor, a microcontroller, or another suitable programmable device), a memory, input units, and output units. The processing unit of the electronic processor 200 may include, among other things, a control unit, an arithmetic logic unit ("ALU"), and registers. In some embodiments, the electronic processor may be implemented as a programmable microprocessor, an application specific integrated circuit ("ASIC"), one or more field programmable gate arrays ("FPGA"), a group of processing components, or with other suitable electronic processing components.

In some embodiments, the electronic processor 200 may include or be coupled to a memory (for example, a non-transitory, computer-readable medium) that includes one or more devices (for example, RAM, ROM, Flash memory, hard disk storage, etc.) for storing data and/or computer code for completing or facilitating the various processes, layers, and modules described herein. The memory may include database components, object code components, script components, or other types of code and information for supporting the various activities and information structures described in the present application. The electronic processor 200 is configured to retrieve from the memory and execute, among other things, instructions related to the control processes, algorithms, and methods described herein. The electronic processor 200 is also configured to store information on the memory.

In some embodiments, the power source 204 is coupled to and transmits power to the electronic processor 200. The power source 204 may include one or more batteries, such as alkaline batteries, a power tool battery, or a dedicated battery. The batteries may be removable and/or rechargeable. In some examples, the power source 204 includes other power storage devices, such as super-capacitors or ultra-capacitors. In some embodiments, the power source 204 includes combinations of active and passive components (e.g., voltage step-down controllers, voltage converters, rectifiers, filters, etc.) to regulate or control the power provided to the electronic processor 200.

In some embodiments, the power source 204 is configured to provide a drive current to the light source 104 via the PWM driver 206 based on control signals received from the electronic processor 200 to control an intensity of the light source 104. In other words, an intensity of the light source 104 is dependent on the drive current (i.e., power) received from the power source 204. In some embodiments, the electronic processor 200 is configured to control the drive current provided to the light source 104 from the power source 204 by controlling the PWM module 206 to generate PWM duty cycle that controls the amount of drive current provided to the light source 104 from the power source 204.

In one example, the electronic processor 200 is configured to detect a user actuation of one or more of the inputs 208, such as the automatic dimming mode selector 108, the power switch 110, and/or the mode switch 112, by detecting a change in the state of the inputs 208. Other inputs may provide information to the electronic processor 200 based on environmental data. For example, the ambient light sensor 106 may provide a digital or analog signal to the electronic processor 200 based on amount of detected ambient light. Based on the received inputs, the electronic processor 200 determines or performs one or more operations. In one embodiment, the electronic processor 200 may change an operational mode for the light source 104 (for example, a HIGH mode, a MEDIUM mode, a LOW mode, an off mode, or the like) based on a user input from the mode switch. The HIGH, MEDIUM, and LOW modes are understood to refer to a light output level of the lighting device 100.

In some embodiments, the lighting device 100 may only have a power switch 110. The power switch 110 may be a temporary push button, a slider switch, a rotating knob, etc. Accordingly, in such embodiments, the power switch 110 may provide both ON/OFF inputs, as well as allow a user to select an operating mode. For example, a user may actuate the power switch 110 a certain number of times to change the mode of the lighting device 100. In one embodiment, the user may quickly actuate and release the power switch to change modes (for example, HIGH mode, MEDIUM mode, and LOW mode), and actuate and hold the power switch 110 to power the lighting device 100 ON or OFF. Similarly, where the lighting device includes a mode switch 112, actuations of the mode switch 112 can allow a user to select a desired mode. For example, the user may actuate the mode switch 112, which cycles through the available modes of the lighting device 100. Based on the selected mode, the electronic processor 200 then controls the power source 204 to provide a drive current to the light source 104 that corresponds to the selected operational mode. In some embodiments, the lighting device 100 may include a separate actuator to select each mode.

The automatic dimming mode selector 108 may be provided as a dedicated input to allow the user to effectuate an automatic dimming mode of the lighting device 100. The automatic dimming mode will be described in more detail below. The automatic dimming mode selector 108 may be configured as a slider switch. However, other actuator types, such as push buttons, knobs, touch sensors, and the like may be utilized for the automatic dimming mode selector. In one embodiment, the automatic dimming mode selector 108 is a slider switch that utilizes one or more magnets and corresponding Hall Effect sensors to sense an actuation of the automatic dimming mode selector 108. By using a non-contact electrical switch instead of standard electromechanical switch (i.e. a standard make/break electromechanical switch), the life of the automatic dimming mode selector 108 may be extended, and reliability is increased. In one embodiment, a mechanical resistance device, such as a ball detent, can allow the automatic dimming mode selector 108 slider switch to provide tactile feedback to a user when actuating the automatic dimming mode selector 108.

The ambient light sensor 106 is configured to detect a level of light that is applied to the sensor 106. In one embodiment, the ambient light sensor 106 uses one or more photoelectric sensors, such as phototransistors, photoresistors, and/or photodiodes, to convert the light energy received at the ambient light sensor 106 into an electrical signal output. However, other light sensor types are also contemplated. The output of the ambient light sensor 106 is provided to the processor 200, as described above.

In some embodiments, one or more of the components shown in FIG. 2 may be located on a PCB. In some embodiments, one or more of the components shown in FIG. 2 may be located elsewhere within or on the housing 102 of the lighting device 100. In some embodiments, the lighting device 100 includes additional, fewer, or different components than the components shown in FIG. 2. For example, the lighting device 100 may additionally include a display to indicate an operational mode of the lighting device 100. As another example, the lighting device 100 may include current and/or voltage sensors that measure the current being drawn by the light source 104 (i.e., drive current) and/or the voltage of the power source 204.

In some embodiments, the electronic processor 200 generates a pulse width modulated ("PWM") signal that drives the light source. In one embodiment, the electronic processor 200 is in communication with the PWM driver 206 that generates the PWM signal that drives the light source 104. In one embodiment, the electronic processor 200 is operable to vary the PWM duty cycle to adjust the intensities of the light source 104 depending on the operation mode (e.g., HIGH mode, MEDIUM mode, LOW mode, etc.) selected by the user via the inputs 208. In other embodiments, the electronic processor 200 or other suitable circuitry may generate different types of signals or drive currents to power the light source 104 in different modes. In some embodiments, the electronic processor 200 is operable to vary the PWM duty cycle applied to the light sources 104 based on a determined ambient lighting level, as will be described in more detail below.

In some embodiments, the power source 204 comprises one or more lithium ion battery packs. In one example, the power source 204 comprises lithium ion battery pack, such as the REDLITHIUM™ USB battery sold by Milwaukee Tool. The battery pack may have a voltage of, for example, 4V or 6V. However, lithium ion battery packs of more than 6V or less than 4V are also considered. In other embodiments, the power source 204 may be other energy storage devices, such as alkaline batteries, lead acid batteries, nickel metal hydride batteries, etc. In still further embodiments, the power source 204 may be an AC power source, such as provided by a utility. In some embodiments, the power source may be a rechargeable power source, such as a lithium ion battery pack described above. The lighting device 100 may include one or more charging ports to allow a user to couple the lighting device 100 to a power source for charging the power source 204. In one embodiment, the charging port is a Universal Serial Bus ("USB") or USB-C port.

Figure 3:
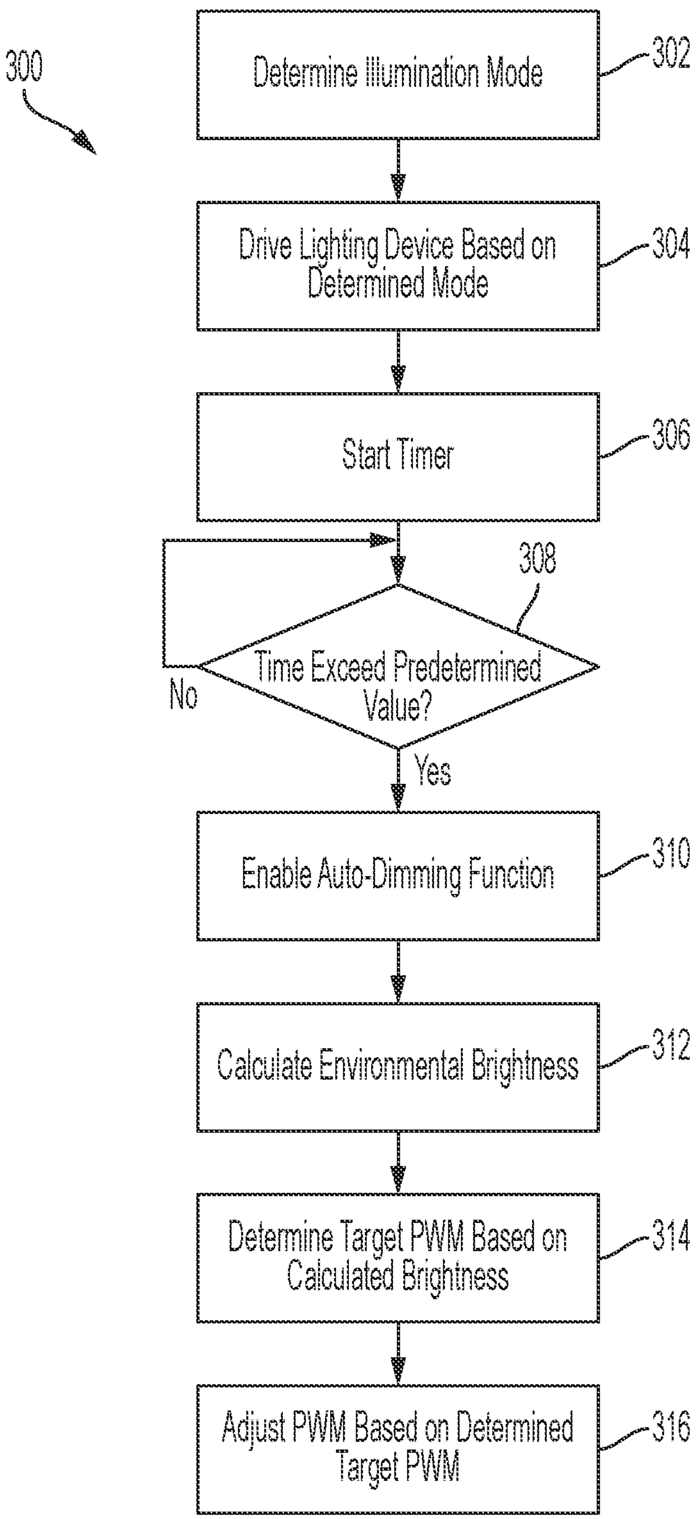
FIG. 3 is a flowchart illustrating a process for automatically dimming a lighting device, according to some embodiments.

Turning now to FIG. 3, a flowchart illustrating a process 300 for automatically dimming a lighting device, such as lighting device 100 described above, is shown according to some embodiments. In one embodiment, the process 300 is executed via the processor 200 described above, in conjunction with one or more of the components of the lighting device 100. It should be understood that reference to the lighting device 100 performing one or more functions should be understood to contemplate one or more of the above described components of the lighting device performing the stated process operation, and vice versa. At process block 302, the electronic processor 200 determines an illumination mode of the lighting device 100. As described above, illumination modes may include HIGH, MEDIUM, and/or LOW operating modes. In some embodiments, only a HIGH mode and a MEDIUM mode are illumination modes of the lighting device 100. These modes may correspond to an amount of light that is output by the lighting device 100. For example, the HIGH mode may generate an output of approximately 700 lumens, the MEDIUM mode may generate an output of approximately 350 lumens, and the LOW mode may generate an output of approximately 150 lumens. As described above, the amount of light output may be controlled by controlling the current supplied to the lighting sources 104 via the PWM driver 206.

In response to determining the current illumination mode of the lighting device 100, at process block 304, the light source 104 is driven based on the determined mode (for example, HIGH, MEDIUM, or LOW). At process block 306 a timer is started based on a predefined time value. In one embodiment, the predefined time value is two seconds. However, time values of more than two seconds or less than two seconds are also contemplated. At process block 308, the electronic processor 200 determines whether the timer has expired. Based on determining that the timer has not expired, the processor 200 continues to evaluate whether the timer has expired at process block 308. In response to determining that the timer has expired, the processor 200 enables the auto-dimming function at process block 310. In some examples, the processor 200 only enables the auto-dimming function if the user has enabled the auto-dimming function via the automatic dimming mode selector 108. The processor calculates environmental brightness (i.e. ambient light) at process block 312. A process for calculating environmental brightness will be described in more detail below. However, different methodologies can be used for determining environmental brightness, other than the methods described herein. At process block 314, a target PWM rate is determined based on the calculated environmental brightness. In some embodiments, the target PWM is a function of the default PWM output for a given mode (for example, HIGH, MEDIUM, or LOW) less the default PWM output multiplied by the environmental brightness value, for example as measured in units of Lux, divided by a constant. In one embodiment, the constant represents an upper limit of the environment brightness. For example, in some embodiments, the upper limit is 250 Lux. However, values of more than 250 Lux or less than 250 Lux are also contemplated. For example, in a HIGH mode, the target PWM output may be a PWM analog to digital (AD) value. For example, the PWM output from the processor 200 may have a total resolution rate of 3200. In the above example, the PWM AD output in the HIGH mode may be a value of 3000, or approximately 93.75% duty cycle. Accordingly, assuming the environmental brightness is 100 Lux, and the constant is 250 Lux. Accordingly, the target PWM would be determined as: 3000−3000*(100/250)=1800. Thus, the target PWM output is 1800 (56.25% duty cycle). However, other methods for determining the target PWM output for a given environmental brightness level are also contemplated. Further, in some embodiments, the target PWM output is equal to the default PWM output for a given mode when the environmental brightness is below a specific value, such as 2 Lux. However, values of more than 2 Lux or less than 2 Lux are also contemplated.

At process block 316, the processor 200 adjusts the PWM based on the determined target PWM. The adjustment of PWM output will be discussed in more detail in regards to FIG. 5, described below.

Figure 4:
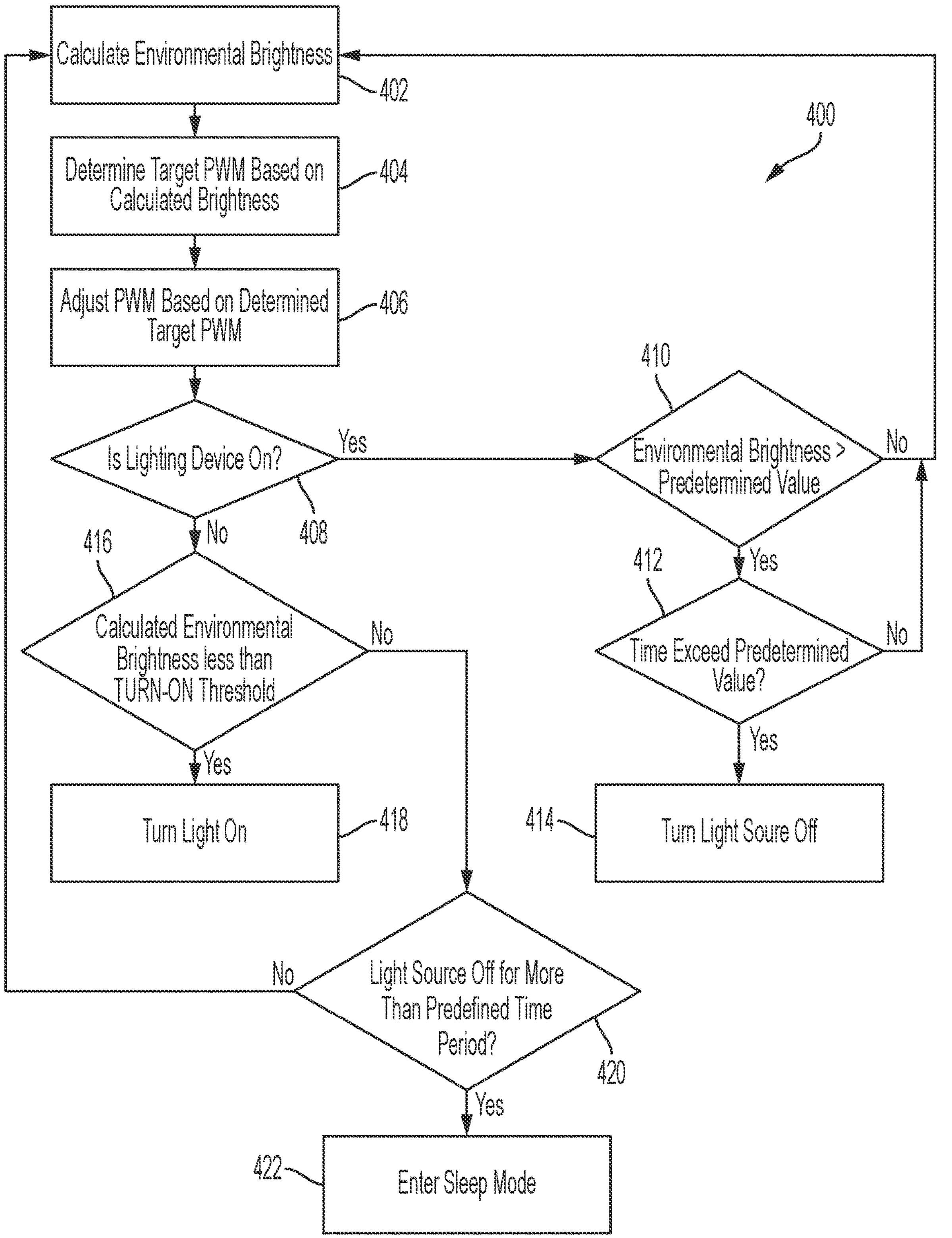
FIG. 4 is a flow chart illustrating a process for operating a lighting device in a high environmental brightness scenario, according to some embodiments.

Turning now to FIG. 4, a process 400 for operating the lighting device 100 in a high environmental brightness scenario (for example, a user working outside on a sunny day) is described. This process 400 may also be described as an ON/OFF process. At process block 402, the processor 200 calculates the environmental brightness, similar to as described in regards to process block 312 above. At process block 404 the processor 200 determines the target PWM output based on the calculated environmental brightness (similar to process block 314 described above), and at process block 406, the PWM output is adjusted based on the determined target PWM output (similar to process block 316 described above). At process block 408, the processor 200 determines whether the light source 104 is ON (e.g. is power being provided to the light source 104). In response to determining that the light source 104 is ON, the processor 200 then determines whether the environmental brightness exceeds a predetermined value at process block 410. In one embodiment, the predetermined value is 250 Lux. However, predetermined values of more than 250 Lux or less than 250 Lux are also contemplated. In response to determining that the environmental brightness does not exceed the predetermined value, the processor 200 continues to monitor the environmental brightness at process block 402.

In response to determining that the environmental brightness does exceed the predetermined value, the processor 200 determines whether the environmental brightness exceeds the predetermined value for more than a predetermined time at process block 412. In one embodiment, the predetermined time is 0.2 seconds. However, values of more than 0.2 seconds or less than 0.2 seconds are also contemplated. This time delay prevents unwanted modification to the lighting device 100 output for temporary changes in lighting, such as the user momentarily shining the light in a mirror causing the detected environmental brightness to rapidly increase, or other temporary lighting changes. Based on the environmental brightness not exceeding the predetermined value for the predetermined time, the processor 200 continues to calculate environmental brightness at process block 402. In response to the environmental brightness exceeding the predetermined value for the predetermined time, the processor 200 turns the light source 104 OFF at process block 414.

In response to determining that the light source 104 is not ON at process block 408, the processor 200 determines whether the calculated environmental brightness is less than a TURN-ON threshold value at process block 416. The TURN-ON threshold value, in one embodiment, is 100 Lux. However, values of more than 100 Lux or less than 100 Lux are also contemplated. Based on determining that the calculated environmental brightness is less than the TURN-ON threshold, the processor 200 turns the light source 104 ON at process block 418. In response to determining that the calculated environmental brightness is not less than the TURN-ON threshold, the process determines whether the light source 104 has been OFF for more than a predetermined time period at process block 420. In one embodiment, the predetermined time period is 10 minutes. However, time periods of greater than 10 minutes or less than 10 minutes are also contemplated. Based on the lighting device having not been OFF for more than the predetermined time period, the processor 200 continues to calculate the environmental brightness at process block 402. In response to the light source 104 being OFF for more than the predetermine time period, the processor 200 puts the lighting device 100 in a sleep mode at process block 422. In one embodiment, the sleep mode prevents the lighting device 100 from turning ON automatically based on the environmental brightness falling below a predetermined value (for example, 100 Lux). To operate the lighting device 100 when in sleep mode, a positive user action, such as actuating the power switch 110, would be required.

Figure 5:
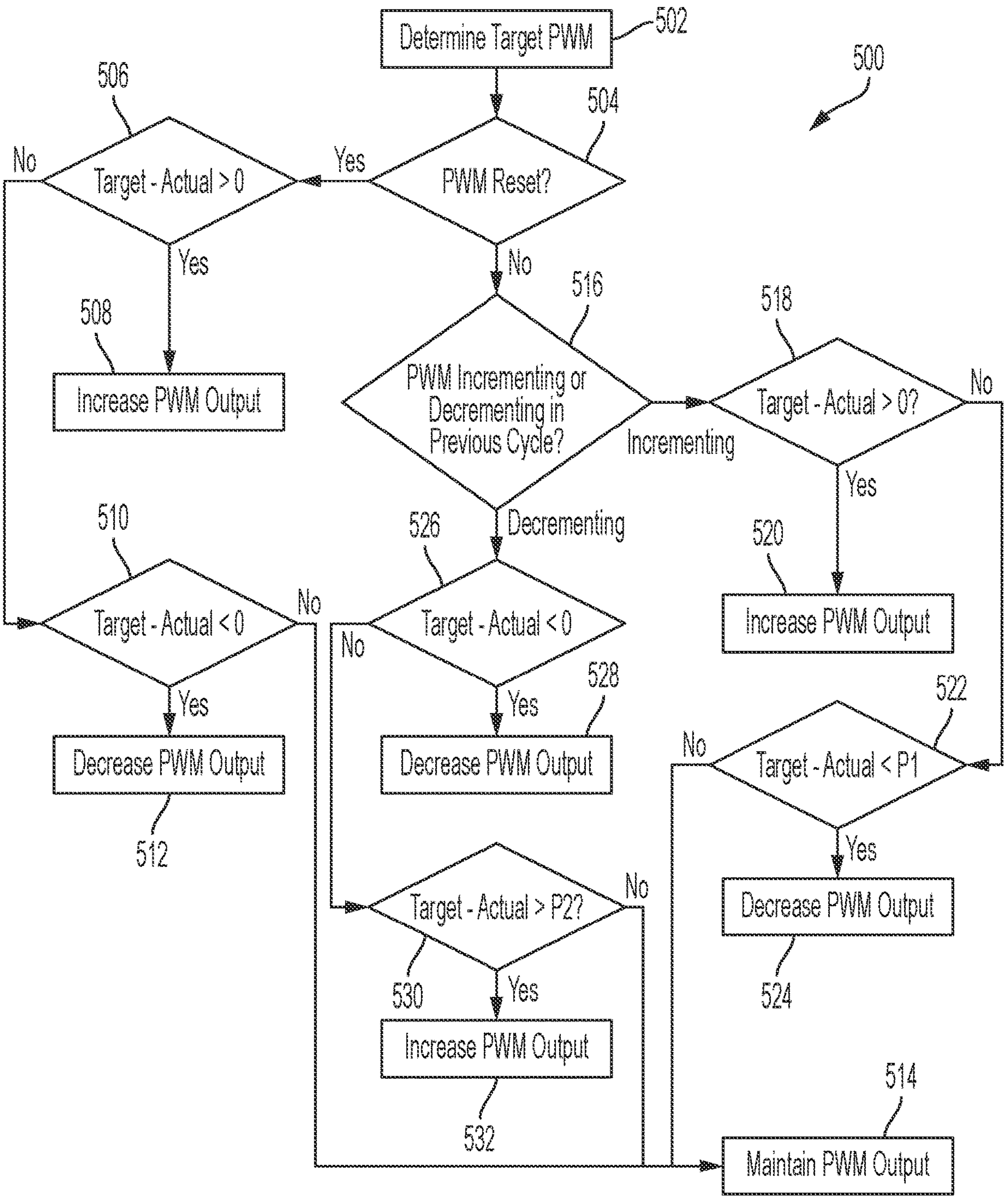
FIG. 5 is a flow chart illustrating a process for adjusting a pulse width modulation ("PWM") output based on a determined target PWM value, according to some embodiments.

Turning now to FIG. 5, a process 500 for adjusting the PWM output based on the determined target PWM is shown, according to some embodiments. At process block 502, the processor 200 determines a target PWM output based on a calculated environmental brightness. In one embodiment, the processor 200 determines the target PWM output as described above. At process block 504, the processor 200 then determines whether the PWM output had recently been reset, such as when the lighting device 100 is turned ON or OFF, or a mode is changed, and is operating at the default PWM outputs for a given mode. Based on determining that the PWM output has been reset, the processor 200 determines whether a difference between the target PWM output and the actual PWM output is greater than zero. In response to determining that the difference between the target PWM output and the actual PWM output is greater than zero, the processor 200 increases the PWM output (i.e. increases the light output) at process block 508. In response to determining that the difference between the target PWM output and the actual PWM output is not greater than zero, the processor 200 then determines whether the difference between the target PWM output and the actual PWM output is less than 0 at process block 510. Based on determining that the difference between the target PWM output and the actual PWM output is less than 0, the processor 200 decreases the PWM output (i.e. reduces the light output) at process block 512. In response to determining that the difference between the target PWM output and the actual PWM output is not less than 0, the PWM output is held constant by the processor 200 at process block 514.

In response to determining that the PWM output had not been reset, the processor 200 determines whether the PWM output was increasing or decreasing in a previous cycle (for example, during the last execution of the process 500, was the PWM output increased or decreased) at process block

516. In response to determining that the PWM output was increasing in the previous cycle, the processor 200 then determines whether the difference between the target PWM output and the actual PWM output is greater than 0 at process block 518. In response to the processor 200 determining that the difference between the target PWM output and the actual PWM output is greater than 0, the processor 200 increases the PWM output at process block 520.

In response to the processor 200 determining that the difference between the target PWM output and the actual PWM output is not greater than 0, the processor 200 determines whether the difference between the target PWM output and the actual PWM output is less than a first predetermined PWM output value at process block 522. In one embodiment, the first predetermined PWM output value is −200. However, PWM output values of more than −200 or less than −200 are also contemplated. In response to the processor 200 determining that the difference between the target PWM output and the actual PWM output is less than the first predetermined PWM output value, the PWM output is decreased at process block 524. In response to the processor 200 determining that the difference between the target PWM output and the actual PWM output is not less than the predetermined PWM output value, the processor 200 maintains the current PWM output at process block 514.

In response to the processor 200 determining that the PWM output was decreasing in a previous cycle at process block 516, the processor 200 then determines whether the difference between the target PWM output and the actual PWM output is less than 0 at process block 526. In response to the processor 200 determining that the difference between the target PWM output and the actual PWM output is less than 0, the PWM output is decreased at process block 528. In response to the processor 200 determining that the difference between the target PWM output and the actual PWM output is not less than 0, at process block 530, the processor 200 determines whether the difference between the target PWM output and the actual PWM output is greater than a second predetermined PWM output value. In one embodiment, the second predetermined PWM value is 200. However, values of more than 200 or less than 200 are also contemplated. In response to the processor 200 determining that the difference between the target PWM output and the actual PWM output is greater than the second predetermined PWM output value, the processor 200 increases the PWM output at process block 532. In response to the processor 200 determining that the difference between the target PWM output and the actual PWM output is not greater than the second predetermined output value, the processor 200 maintains the current PWM output at process block 514.

Figure 6:
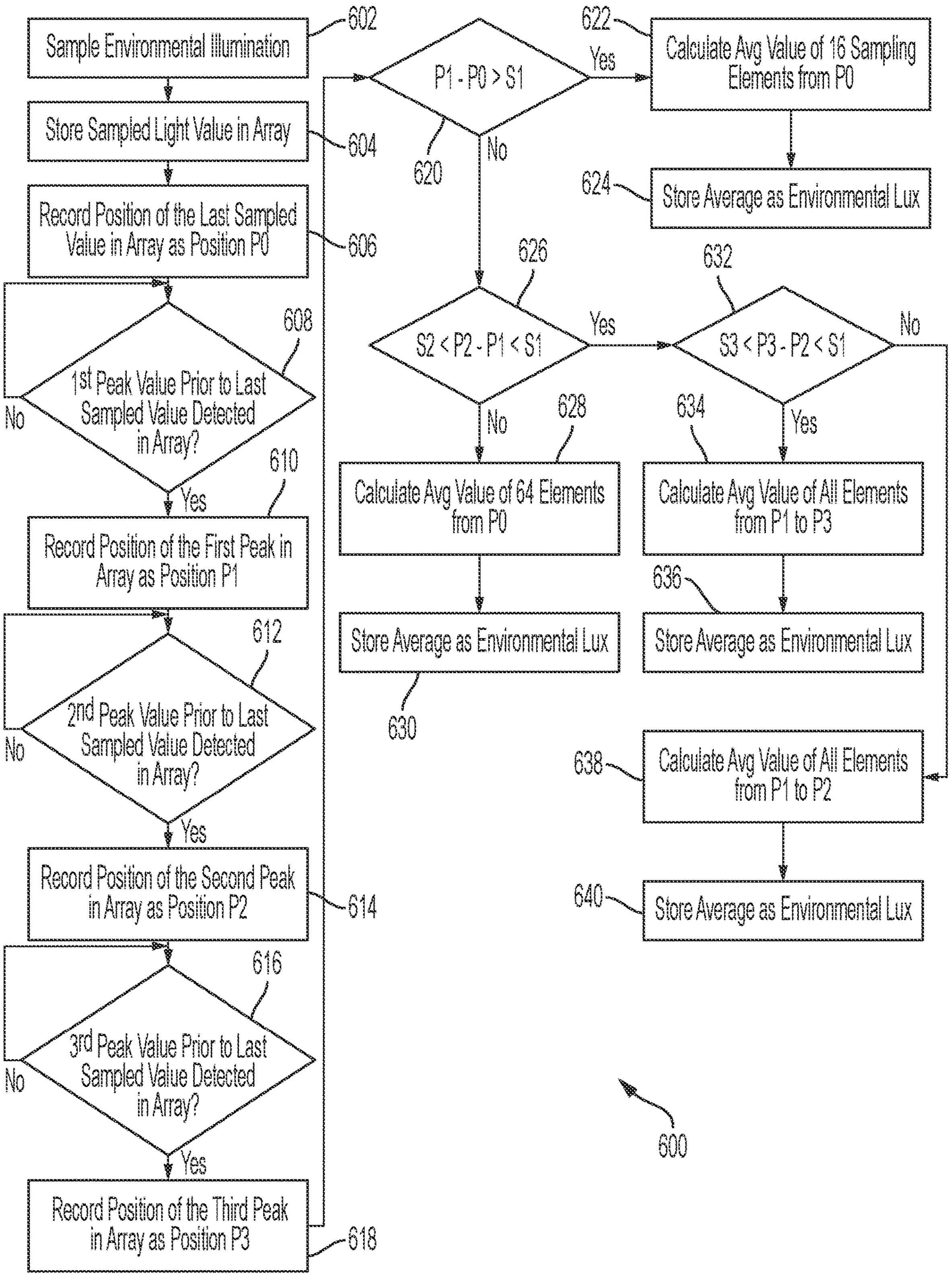
FIG. 6 is a flowchart illustrating a process for determining environmental brightness, according to some embodiments.

Turning now to FIG. 6, a flowchart illustrating a process 600 for determining environmental brightness is shown, according to some embodiments. At process block 602, an illumination value is sampled. In one embodiment, the illumination value is provided by the ambient light sensor 106, described above. In some embodiments, the processor 200 samples the environmental lighting levels provided by the ambient light sensor every 200 micro-seconds. However, values of more than 200 micro-seconds or less than 200 micro-seconds are also contemplated. The processor 200 then stores the sampled illumination values in an array at process block 604. In one embodiment, the processor 200 stores the sampled illumination values in the memory 202. In some embodiments the array contains 150 elements (i.e. data points); however, arrays of more than 150 elements or less than 150 elements are also contemplated. At process block 606, the processor 200 records the position of the last sampled value in the array as position P0. The last sampled value is understood to mean the most recently sampled illumination value. At process block 608 the processor 200 determines whether there is a $1^{st}$ peak value (either positive or negative value) prior to the last sampled value in the array.

In response to determining that there is no first peak value prior to the last sampled value detected in the array, the processor 200 continues to monitor for a first peak value at process block 608. In response to determining a first peak value in the array prior to the last sampled value, the position of the first peak value is recorded as position P1 in the array at process block 610. At process block 612, the processor 200 determines whether there is a second peak value prior to the last sampled value in the array. In response to determining that there is no second peak value prior to the last sampled value detected in the array, the processor 200 continues to monitor for a second peak value at process block 612. In response to determining a second peak value in the array prior to the last sampled value, the position of the second peak value is recorded as position P2 in the array at process block 614. At process block 616, the processor 200 determines whether there is a third peak value prior to the last sampled value in the array. In response to determining that there is no third peak value prior to the last sampled value detected in the array, the processor 200 continues to monitor for a third peak value at process block 616. In response to determining a third peak value in the array prior to the last sampled value, the position of the third peak value is recorded as position P3 in the array at process block 618.

Figure 7:
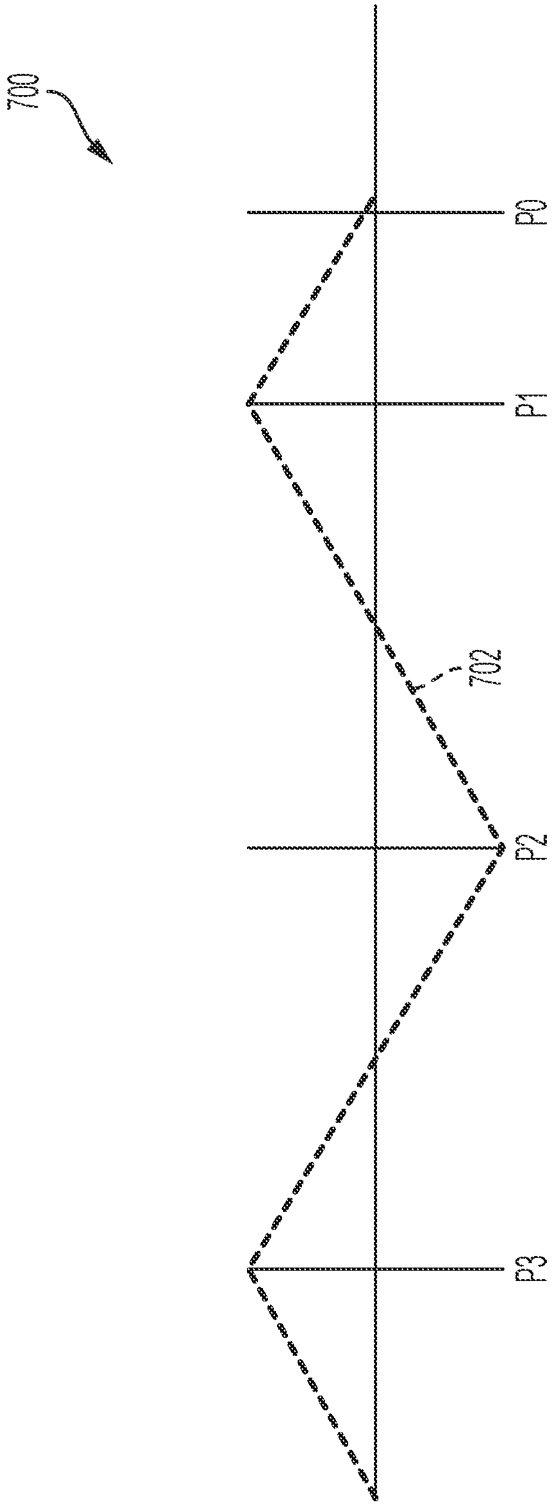
FIG. 7 is a graph of illustrating sampled environmental illumination readings, according to some embodiments.

Turning briefly to FIG. 7, a plot 700 showing data points 702 stored in the array is shown. Peak values P1, P2, and P3, in combination with most recent sample value P0 are also shown. It should be understood that the plot 700 is for illustrative purpose only and the data points may take on different waveforms, have peaks at different positions, etc.

Returning now to FIG. 6, at process block 620 the processor 200 determines whether the number of samples between position P1 and position P0 is greater than a first predetermined sample size (S1). In one embodiment, the first predetermined sample size is 30 samples. However, sample sizes of more than 30 samples or less than 30 samples are also contemplated. In response to determining that the number of samples between P1 and P0 is more than the first predetermined sample size, the processor 200 calculates an average value of, for example, 16 sampling data points prior to and including P0 at process block 622. In other embodiments, the processor 200 may calculate the average value using fewer or more sampling data points. The average value is then stored as the environmental brightness level at process block 624. This environmental brightness level may be utilized by one or more processes described herein.

In response to determining that the number of samples between P1 and P0 is not more than the first predetermined sample size, the processor 200 determines whether the number of samples between P2 and P1 is between a second predetermined sample size (S2) and the first predetermined sample size at process block 626. In one embodiment, the second predetermined sample size is 20 samples. However, values of more than 20 samples and less than 20 samples are also contemplated. In one embodiment, the second predetermined sample size is less than the first predetermined sample size. In response to the processor 200 determining that the number of samples between P2 and P1 is not between the second predetermined sample size and the first predetermined sample size, the processor 200 calculates an average value of, for example, 64 sampling data points prior to and including P0 at process block 628. In other embodiments, the processor 200 may calculate the average value using fewer or more sampling data points. The average value is then stored as the environmental brightness level at process block 630.

In response to the processor 200 determining that the number of samples between P2 and P1 is between the second predetermined sample size and the first predetermined sample size, the processor 200 then determines whether the number of samples between P3 and P2 is between a third predetermined sample size (S3) and the first predetermined sample size at process block 632. In one embodiment, the third predetermined sample size is 10 samples. However, values of more than 10 samples and less than 10 samples are also contemplated. In one embodiment, the third predetermined sample size is less than the first predetermined sample size and the second predetermined sample size. In response to the processor 200 determining that the number of samples between P3 and P2 is between the third predetermined sample size and the first predetermined sample size, the processor 200 calculates an average value of all the data points between P1 and P3 at process block 634. In some embodiments, the processor 200 may only use a subset of the data points between P1 and P3 to calculate the average value. The average value is then stored as the environmental brightness level at process block 636. In response to the processor 200 determining that the number of samples between P3 and P2 is not between the third predetermined sample size and the first predetermined sample size, the processor 200 calculates an average value of all the data points between P1 and P2 at process block 638. In some embodiments, the processor 200 may only use a subset of the data points between P1 and P2 to calculate the average value. The average value is then stored as the environmental brightness level at process block 640.

The above process 600 provides for the processor 200 to dynamically determine an average environmental brightness level based on variations in the measured and stored illumination values detected by the ambient light sensor 106. Thus, when there are more variations in the detected illumination values, different averaging methodologies are implemented to ensure that an accurate representation of the environmental brightness is determined.

Figure 8:
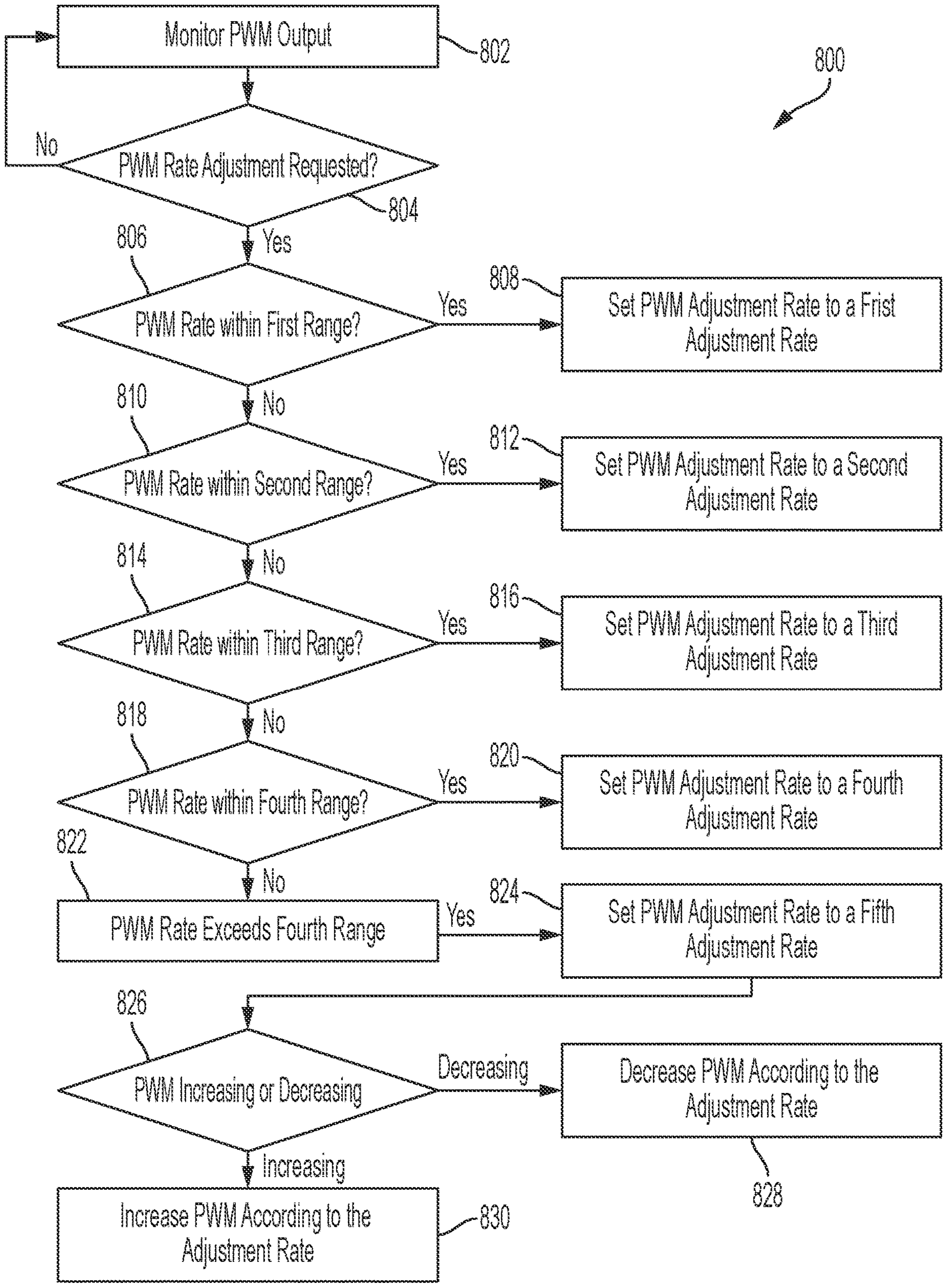
FIG. 8 is a flowchart illustrating a process for adjusting a PWM output, according to some embodiments.

Turning now to FIG. 8, a flow chart illustrating a process 800 for adjusting a PWM output is described, according to some embodiments. The process 800 may be used to reduce or increase the PWM output as described in process 500 above. The process 800 allows for the PWM output to be dynamically adjusted based on the current PWM output, such that when the PWM output is relatively high (for example, when the light is at full power in HIGH mode) the adjustments to the PWM output are more pronounced than when the PWM output is relatively low. This allows for the light output of the light source to adapt to the environment more effectively, while still providing a smooth change in brightness to the human eye.

At process block 802, the processor 200 monitors the current PWM output being used to operating the lighting device 100. At process block 804 the processor 200 determines whether a PWM output adjustment has been requested. As described above, one or more of the herein described processes may request a PWM output adjustment to increase or decrease the light output of the lighting device 100. In response to determining that no PWM output adjustment was requested, the processor 200 continues to monitor the PWM output at process block 802.

In response to determining that a PWM output adjustment was requested, the processor 200 determines whether the current PWM output is within a first range of a target PWM value, such as determined above, at process block 806. In one embodiment, the range of PWM is expressed in PWM AD, as described above. The first range may be, for example, between 50 (1.5625%) and 100 (3.125%) based on the resolution of the PWM output being 0-3200. In some embodiments, PWM outputs may also be expressed in other units of measure, such as duty cycle (%). In response to determining that the current PWM output is within the first range, the PWM adjustment rate is set at a first rate, at process block 808. The first rate may be, for example, 1 unit of output (0.03125%) per millisecond. In other embodiments, the first rate may be greater or smaller than 1 unit of output (0.03125%) per millisecond.

In response to determining that the current PWM output is not within the first range, the processor 200 determines whether the PWM output is within a second range of the target PWM value at process block 810. The second range is higher than the first range. The second range may be, for example, between 100 (3.125%) and 400 (12.5%). In response to determining that the current PWM output is within the second range, the PWM adjustment rate is set at a second rate at process block 812. The second rate is greater than the first rate. The second rate may be, for example, 2 units of output (0.0625%) per millisecond. In other embodiments, the second rate may be greater or smaller than 2 (0.0625%) units of output per millisecond.

In response to determining that the current PWM output is not within the second range, the processor 200 determines whether the PWM output is within a third range of the target PWM value at process block 814. The third range is higher than the second range. The third range may be, for example, between 400 (12.5%) and 800 (25%). In response to determining that the current PWM output is within the third range, the PWM adjustment rate is set at a third rate at process block 816. The third rate is greater than the second rate. The third rate may be, for example, 4 units of output (0.125%) per millisecond. In other embodiments, the third rate may be greater or smaller than 4 units of output (0.125%) per millisecond.

In response to determining that the current PWM output is not within the third range, the processor 200 determines whether the PWM output is within a fourth range at process block 818. The fourth range is higher than the third range. The fourth range may be, for example, between 800 (25%) and 1600 (50%). In response to determining that the current PWM output is within the fourth range, the PWM adjustment rate is set at a fourth rate at process block 820. The fourth rate is greater than the third rate. The fourth rate may be, for example, 8 units of output (0.25%) per millisecond. In other embodiments, the fourth rate may be greater than or smaller than 8 units of output (0.25%) per millisecond.

In response to determining that the current PWM output is not within the fourth range, the processor 200 determines whether the PWM output is greater than the fourth range at process block 822. For example, the process 200 may determine whether the PWM output is greater than 1600 (50%). In response to the PWM output being determined to be over the fourth range, the PWM adjustment rate is set at a fifth rate at process block 824. The fifth rate is greater than the fourth rate. The fifth rate may be, for example, 16 units of output (0.5%) per millisecond. In other embodiments, the fifth rate may be greater than or smaller than 16 units of output (0.5%) per millisecond.

At process block 826 the processor 200 determines whether the PWM output adjustment request was an increase or a decrease. Based on the PWM output adjustment request being a decrease, the PWM output is decreased according to the determined adjustment rate at process block 828. Based on the PWM output adjustment request being an increase, the PWM output is increased according to the determined adjustment rate at process block 830.

Figure 9:
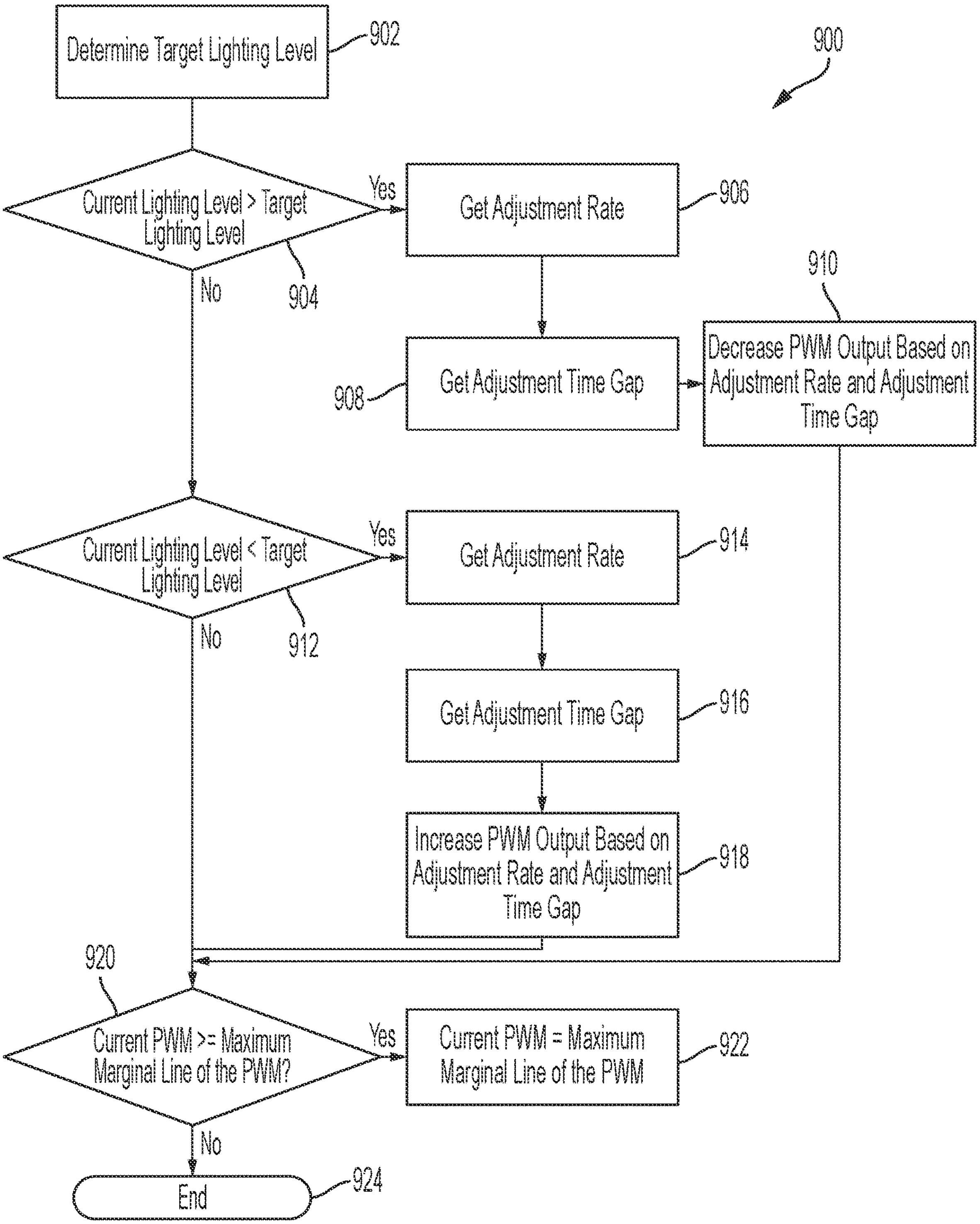
FIG. 9 is a flow chart illustrating a process for adjusting a PWM output based on a determined target lighting levels, according to some embodiments.

Turning now to FIG. 9, a flowchart illustrating a process 900 for adjusting the PWM output based on a determined target lighting level is shown, according to some embodiments. In some embodiments, the process 900 is used in lieu of, or in conjunction with, the process 500 described above. At process block 902, the processor 200 determines a target lighting level. In one example, to determine the target lighting level, the processor 200 first determines whether the default PWM rate for a given lighting mode (e.g. HIGH, MEDIUM, LOW) is less than the current PWM output. Based on determining that the default PWM for the given lighting mode is less than the current PWM output, the target lighting level is set to 0 Lux. As noted above, while the examples described herein use Lux as the measure of illumination, it is understood that other measurements, such as lumens or candlepower, may also be used. In some embodiments, the default PWM output in the HIGH mode is 93.75% of full output, and the default PWM output in the MEDIUM mode is 50%. In some examples, the default PWM output in the LOW mode may be 25%. However, other default values for each of the HIGH, MEDIUM, and LOW modes are also contemplated. In some examples, the herein described lighting devices may only have HIGH and MEDIUM.

Based on determining that the default PWM for the given lighting mode is not less than the current PWM output, the processor 200 calculates the target lighting level. In one embodiment, the processor 200 uses the following equation to determine the target lighting level: Target Lighting Level=(Default PWM Output for Illumination Mode−Current PWM Output)*(Light Output Adjustment Range/PWM Maximum Adjustment Range). As described above, the default PWM output for each illumination mode, HIGH, MEDIUM, LOW, may be 93.75%, 50% and 25%, respectively. However, other values are also contemplated. In one example, the Light Output Adjustment Range is 200 Lux. However, values of more than 200 Lux or less than 200 Lux are also contemplated. In one example, the PWM maximum adjustment range is 99.375%. However, values of more than 99.375% or less than 99.375% are also contemplated. The above formula for determining the target lighting level is one example of determining a target lighting level, and it is contemplated that other target lighting level calculations can also be used.

At process block 904, the processor 200 determines whether the current lighting level is greater than the target lighting level. In one embodiment, the current lighting level is measured by the ambient light sensor 106. In response to determining that the current lighting level is greater than the target lighting level, the processor 200 determines the PWM adjustment rate at process block 906. Determining the PWM adjustment rate is described herein in regards to process 800 and process 1000. Upon determining the PWM adjustment rate, the processor 200 determines the adjustment rate time gap at process block 908. The adjustment rate time gap refers to the time period over which the adjustment rate is applied. The determination of the adjustment rate time gap is described in more detail below in regards to process 1100. The processor 200 then decreases the PWM output (i.e. decreases the light output) based on the determined adjustment rate and adjustment time gap at process block 910.

In response to determining that the current lighting level is not greater than the target lighting level, the process 200 determines whether the current lighting level is less than the target lighting level at process block 912. In response to determining that the current lighting level is less than the target lighting level, the processor 200 determines the PWM adjustment rate at process block 914. Determining the PWM adjustment rate is described herein in regards to process 800 and process 1000. Upon determining the PWM adjustment rate, the processor determines the adjustment rate time gap at process block 916. The processor 200 then increases the PWM output (i.e. increases the light output) based on the determined adjustment rate and adjustment time gap at process block 918.

In response to determining that the current lighting level is not less than the target lighting level, the processor 200 determines whether the current PWM output is greater than or equal to the maximum marginal line of the PWM output at process block 920. The maximum marginal line of the PWM output is representative of the maximum PWM value for a given lighting mode (e.g. HIGH, MEDIUM, LOW). Based on determining that the current PWM output is greater than or equal to the maximum marginal line of the PWM output, the current PWM output is adjusted to be equal to the maximum marginal line of the PWM output at process block 922. Based on determining that the current PWM output is not greater than or equal to the maximum marginal line of the PWM output, the process ends at process block 924.

Figure 10:
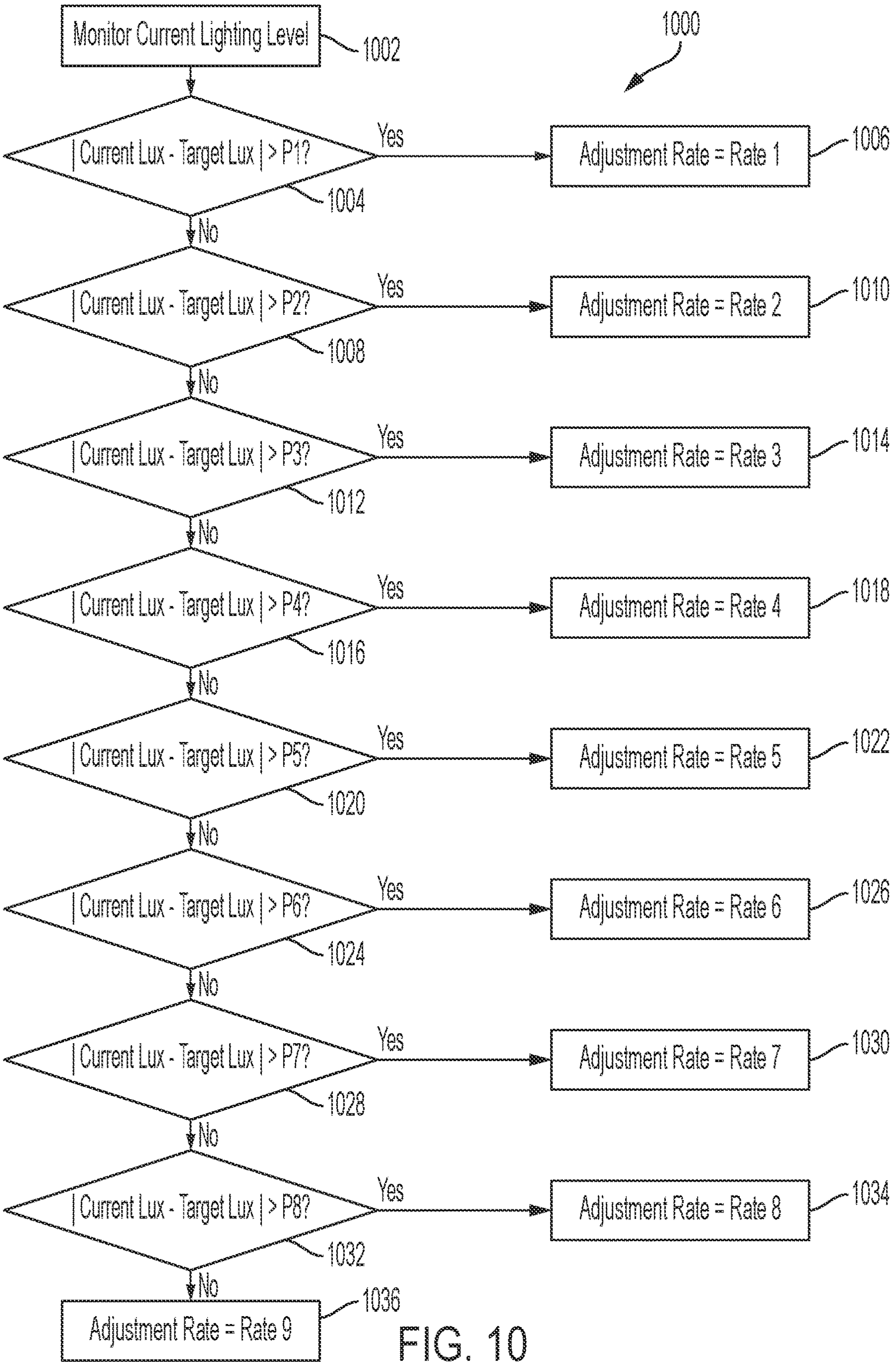
FIG. 10 is a flow chart illustrating a process for determining a PWM adjustment rate, according to some embodiments.

Turning now to FIG. 10, a process 1000 for determining a PWM adjustment rate based on determined lighting levels is described, according to some embodiments. In some embodiments, the process 1000 may be used in lieu of, or in conjunction with, the process 800 described above. The process 1000 adjusts (e.g., increases or decreases) light output at different rates based on the current light output. For example, when the light output is relatively high, the process 1000 decreases the light output at a faster rate than when the light output is relatively low. At process block 1002, the processor 200 monitors an environmental lighting level. In one embodiment, the environmental lighting level is determined as described in regards to process 600, above. At process block 1004, the processor 200 determines whether the difference between the current lighting level and a target lighting level, such as determined above, exceeds a first lighting level. In one embodiment, the first lighting level is 150 Lux. However, values of more than 150 Lux or less than 150 Lux are also contemplated for the first lighting level. In response to determining that the difference between the current lighting level and the target lighting level is greater than the first lighting level, the adjustment rate is set to a first adjustment rate at process block 1006. In one embodiment, the first adjustment rate is approximately a 1.5625% PWM output value (i.e. a change of 1.5625% of the PWM output). However, first adjustment rates of more than 1.5625% and less than 1.5626% are also contemplated. In one embodiment, the first adjustment rate is done over a period of time, such as an adjustment time gap, described below. In other embodiments, the first adjustment rate is done over a first predetermined time period. For example, the first predetermined time period may be 1 ms. However, first predetermined time periods of more than 1 ms or less than 1 ms are also contemplated.

In response to determining that the difference between the current lighting level and the target lighting level is not greater than the first lighting level, the processor 200 determines whether the difference between the current lighting level and the target lighting level is greater than a second lighting level at process block 1008. The second lighting level is less than the first lighting level. In one example, the second lighting level is 120 Lux. However, second lighting levels of more than 120 Lux or less than 120 Lux are also contemplated. In response to determining that the difference between the current lighting level and the target lighting level is greater than the second lighting level, the adjustment rate is set to a second adjustment rate at process block 1010. The second adjustment rate is less than the first adjustment rate. In one embodiment, the second adjustment rate is approximately a 1.25% PWM output value (i.e. a change of 1.25% of the PWM output). However, second adjustment rates of more than 1.25% and less than 1.25% are also contemplated. In one embodiment, the second adjustment rate is done over a period of time, such as an adjustment time gap, described below. In other embodiments, the second adjustment rate is done over a second predetermined time period. For example, the second predetermined time period may be 2 ms. However, second predetermined time periods of more than 2 ms or less than 2 ms are also contemplated.

In response to determining that the difference between the current lighting level and the target lighting level is not greater than the second lighting level, the processor 200 determines whether the difference between the current lighting level and the target lighting level is greater than a third lighting level at process block 1012. The third lighting level is less than the second lighting level. In one example, the third lighting level is 80 Lux. However, third lighting levels of more than 80 Lux or less than 80 Lux are also contemplated. In response to determining that the difference between the current lighting level and the target lighting level is greater than the second lighting level, the adjustment rate is set to a third adjustment rate at process block 1014. The third adjustment rate is less than the second adjustment rate. In one embodiment, the third adjustment rate is approximately a 0.9375% PWM output value (i.e. a change of 0.9375% of the PWM output). However, third adjustment rates of more than 0.9375% and less than 0.9375% are also contemplated. In one embodiment, the third adjustment rate is done over a period of time, such as an adjustment time gap, described below. In other embodiments, the third adjustment rate is done over a third predetermined time period. For example, the third predetermined time period may be 4 ms. However, third predetermined time periods of more than 4 ms or less than 4 ms are also contemplated.

In response to determining that the difference between the current lighting level and the target lighting level is not greater than the third lighting level, the processor 200 determines whether the difference between the current lighting level and the target lighting level is greater than a fourth lighting level at process block 1016. The fourth lighting level is less than the third lighting level. In one example, the fourth lighting level is 60 Lux. However, fourth lighting levels of more than 60 Lux or less than 60 Lux are also contemplated. In response to determining that the difference between the current lighting level and the target lighting level is greater than the fourth lighting level, the adjustment rate is set to a fourth adjustment rate at process block 1018. The fourth adjustment rate is less than the third adjustment rate. In one embodiment, the fourth adjustment rate is approximately a 0.46875% PWM output value (i.e. a change of 0.46875% of the PWM output). However, fourth adjustment rates of more than 0.46875% and less than 0.46875% are also contemplated. In one embodiment, the fourth adjustment rate is done over a period of time, such as an adjustment time gap, described below. In other embodiments, the fourth adjustment rate is done over a fourth predetermined time period. For example, the fourth predetermined time period may be 8 ms. However, fourth predetermined time periods of more than 8 ms or less than 8 ms are also contemplated.

In response to determining that the difference between the current lighting level and the target lighting level is not greater than the fourth lighting level, the processor 200 determines whether the difference between the current lighting level and the target lighting level is greater than a fifth lighting level at process block 1020. The fifth lighting level is less than the fourth lighting level. In one example, the fifth lighting level is 40 Lux. However, fifth lighting levels of more than 40 Lux or less than 40 Lux are also contemplated. In response to determining that the difference between the current lighting level and the target lighting level is greater than the fifth lighting level, the adjustment rate is set to a fifth adjustment rate at process block 1022. The fifth adjustment rate is less than the fourth adjustment rate. In one embodiment, the fifth adjustment rate is approximately a 0.21875% PWM output value (i.e. a change of 0.21875% of the PWM output). However, fifth adjustment rates of more than 0.21875% and less than 0.21875% are also contemplated. In one embodiment, the fifth adjustment rate is done over a period of time, such as an adjustment time gap, described below. In other embodiments, the fifth adjustment rate is done over a fifth predetermined time period. For example, the fifth predetermined time period may be 16 ms. However, fifth predetermined time periods of more than 16 ms or less than 16 ms are also contemplated.

In response to determining that the difference between the current lighting level and the target lighting level is not greater than the fifth lighting level, the processor 200 determines whether the difference between the current lighting level and the target lighting level is greater than a sixth lighting level at process block 1024. The sixth lighting level is less than the fifth lighting level. In one example, the sixth lighting level is 20 Lux. However, sixth lighting levels of more than 20 Lux or less than 20 Lux are also contemplated. In response to determining that the difference between the current lighting level and the target lighting level is greater than the sixth lighting level, the adjustment rate is set to a sixth adjustment rate at process block 1026. The sixth adjustment rate is less than the fifth adjustment rate. In one embodiment, the sixth adjustment rate is approximately a 0.15625% PWM output value (i.e. a change of 0.15625% of the PWM output). However, sixth adjustment rates of more than 0.15625% and less than 0.15625% are also contemplated. In one embodiment, the sixth adjustment rate is done over a period of time, such as an adjustment time gap, described below. In other embodiments, the sixth adjustment rate is done over a sixth predetermined time period. For example, the sixth predetermined time period may be 32 ms. However, sixth predetermined time periods of more than 32 ms or less than 32 ms are also contemplated.

In response to determining that the difference between the current lighting level and the target lighting level is not greater than the sixth lighting level, the processor 200 determines whether the difference between the current lighting level and the target lighting level is greater than a seventh lighting level at process block 1028. The seventh lighting level is less than the sixth lighting level. In one example, the seventh lighting level is 10 Lux. However, seventh lighting levels of more than 10 Lux or less than 10 Lux are also contemplated. In response to determining that the difference between the current lighting level and the target lighting level is greater than the seventh lighting level, the adjustment rate is set to a seventh adjustment rate at process block 1030. The seventh adjustment rate is less than the sixth adjustment rate. In one embodiment, the seventh adjustment rate is approximately a 0.09375% PWM output value (i.e. a change of 0.09375% of the PWM output). However, seventh adjustment rates of more than 0.09375% and less than 0.09375% are also contemplated. In one embodiment, the seventh adjustment rate is done over a period of time, such as an adjustment time gap, described below. In other embodiments, the seventh adjustment rate is done over a seventh predetermined time period. For example, the seventh predetermined time period may be 64 ms. However, seventh predetermined time periods of more than 64 ms or less than 64 ms are also contemplated.

In response to determining that the difference between the current lighting level and the target lighting level is not greater than the seventh lighting level, the processor 200 determines whether the difference between the current lighting level and the target lighting level is greater than an eighth lighting level at process block 1032. The eighth lighting level is less than the seventh lighting level. In one example, the eighth lighting level is 5 Lux. However, eighth lighting levels of more than 5 Lux or less than 5 Lux are also contemplated. In response to determining that the difference between the current lighting level and the target lighting level is greater than the eighth lighting level, the adjustment rate is set to an eighth adjustment rate at process block 1034. The eighth adjustment rate is less than the seventh adjustment rate. In one embodiment, the eighth adjustment rate is approximately a 0.0625% PWM output value (i.e. a change of 0.0625% of the PWM output). However, eighth adjustment rates of more than 0.0625% and less than 0.0625% are also contemplated. In one embodiment, the eighth adjustment rate is done over a period of time, such as an adjustment time gap, described below. In other embodiments, the eighth adjustment rate is done over an eighth predetermined time period. For example, the eighth predetermined time period may be 128 ms. However, eighth predetermined time periods of more than 128 ms or less than 128 ms are also contemplated.

In response to determining that the difference between the current lighting level and the target lighting level is not greater than the eighth lighting level, the processor 200 determines that the adjustment rate is equal to a ninth adjustment rate at process block 1036. The ninth adjustment rate is less than the eighth adjustment rate. In one embodiment, the ninth adjustment rate is approximately a 0.03125% PWM output value (i.e. a change of 0.03125% of the PWM output). However, ninth adjustment rates of more than 0.03125% and less than 0.03125% are also contemplated. In one embodiment, the ninth adjustment rate is done over a period of time, such as an adjustment time gap, described below. In other embodiments, the ninth adjustment rate is done over a ninth predetermined time period. For example, the ninth predetermined time period may be 256 ms. However, ninth predetermined time periods of more than 256 ms or less than 256 ms are also contemplated.

Figure 11:
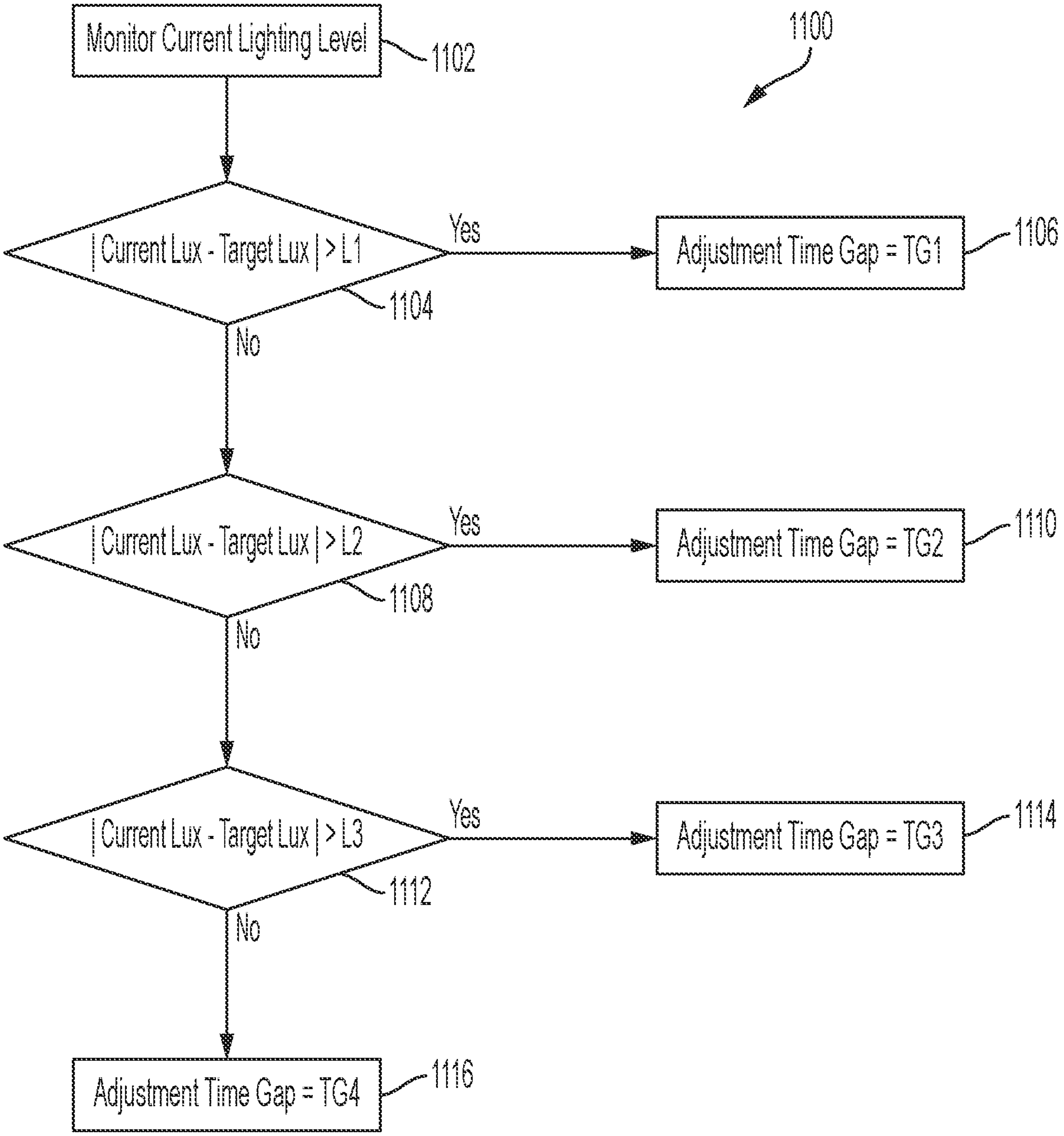
FIG. 11 is a flow chart illustrating a process for determining a PWM adjustment time gap, according to some embodiments.

Turning now to FIG. 11, a process 1100 for determining an adjustment time gap is shown, according to some embodiments. As described above, the adjustment time gap is the amount of time over which an adjustment rate is applied, such as described in process 1000, above. The process 1100 adjusts (e.g., increases or decreases) the time gap at different rates based on the current light output. For example, when the light output is relatively high, the process 1100 has a shorter time gap than when the light output is relatively low. At process block 1102, the processor 200 monitors the lighting level, such as described above. At process block 1104, the processor 200 determines whether the absolute value of the difference between the current lighting level and the target lighting level (as determined above) is greater than a first lighting level. In one embodiment, the first lighting level is 20 Lux. However, first lighting levels of more than 20 Lux or less than 20 Lux are also contemplated. In response to determining that the difference is greater than the first lighting level, the processor 200 determines that the adjustment time gap is equal to a first time gap value at process block 1106. In one embodiment, the first time gap value is 5 ms. However, first time gap values of more than 5 ms and less than 5 ms are also contemplated.

In response to determining that the absolute value of the difference between the current lighting level and the target lighting level is not greater than the first lighting level, the processor 200 determines whether the absolute value of the difference between the current lighting level and the target lighting level (as determined above) is greater than a second lighting level at process block 1108. In one embodiment, the second lighting level is less than the first lighting level. In one example, the second lighting level is 10 Lux. However, second lighting levels of more than 10 Lux or less than 10 Lux are also contemplated. In response to determining that the difference is greater than the second lighting level, the processor 200 determines that the adjustment time gap is equal to a second time gap value at process block 1110. In one embodiment, the second time gap is a greater time gap than the first time gap. In one example, the second time gap value is 10 ms. However, second time gap values of more than 10 ms and less than 10 ms are also contemplated.

In response to determining that the absolute value of the difference between the current lighting level and the target lighting level is not greater than the second lighting level, the processor 200 determines whether the absolute value of the difference between the current lighting level and the target lighting level (as determined above) is greater than a third lighting level at process block 1112. In one embodiment, the third lighting level is less than the second lighting level. In one example, the third lighting level is 5 Lux. However, third lighting levels of more than 5 Lux or less than 5 Lux are also contemplated. In response to determining that the difference is greater than the third lighting level, the processor 200 determines that the adjustment time gap is equal to a third time gap value at process block 1114. In one embodiment, the third time gap value is greater than the second time gap value. In one example, the third time gap value is 15 ms. However, third time gap values of more than 15 ms and less than 15 ms are also contemplated.

In response to determining that the absolute value of the difference between the current lighting level and the target lighting level is not greater than the third lighting level, the processor 200 determines that the adjustment time gap is equal to a fourth time gap value at process block 1116. In one embodiment, the fourth time gap value is greater than the third gap value. In one example, the fourth time gap value is 20 ms. However, fourth time gap values of more than 20 ms and less than 20 ms are also contemplated.

Figure 12:
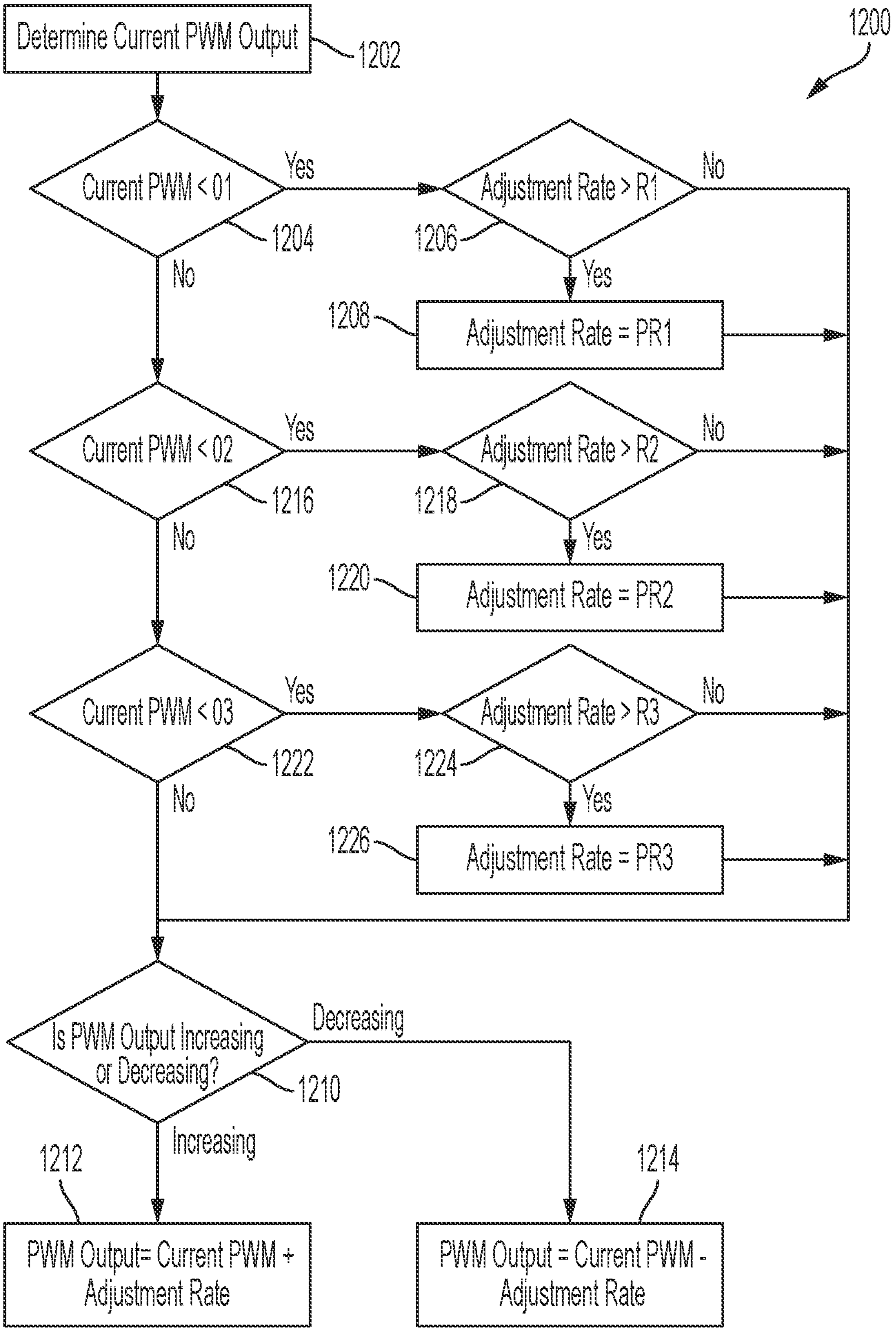
FIG. 12 is a flow chart illustrating a process for adjusting an output PWM value for a lighting device, according to some embodiments.

Turning now to FIG. 12, a process 1200 for adjusting the output PWM is shown, according to some embodiments. In one embodiment, the process 1200 may provide the control of the adjustment of the output PWM as described in process 900, above. In some examples, the process 1200 provides additional fine adjustments to the adjustment of the output PWM based on the current PWM output. For example, where the lighting output is already very low, the adjustment rate may also be reduced to provide a more smooth visible transition of lighting levels to a user. In some embodiments, the process 1200 may be used to provide the actual PWM adjustments to herein described processes, such as process 900. However, in other embodiments, herein described processes such as process 900 can adjust the PWM output based solely on the determined adjustment rate and adjustment time gap, as described in the above processes 1000 and/or the process 1100.

At process block 1202, the processor 200 determines the current PWM output. At process block 1204, the processor 200 determines whether the current PWM output is less than a first output value. In some embodiments, the first output value is approximately 0.9375% of full output. However, first output values of more than 0.9375% and less than 0.9375% are also contemplated. In response to determining that the current PWM output is less than the first output value, the processor 200 then determines if the PWM adjustment rate is greater than a first minimum rate at process block 1206. In one embodiment, the first minimum rate is 0.03125% of PWM output. However, first minimum rates of more than 0.03125% and less than 0.03125% are also contemplated. In response to determining that the adjustment rate is greater than the first minimum rate, the adjustment rate is set to the first minimum adjustment rate at process block 1208. In response to determining that the adjustment rate is not greater than the first minimum rate, the processor 200 determines whether the PWM output is to be increased or decreased at process block 1210. In response to determining that the PWM output is to be increased, the PWM output is adjusted by increasing the current PWM by the adjustment rate at process block 1212. In response to determining that the PWM output is to be decreased, the PWM output is adjusted by decreasing the current PWM by the adjustment rate at process block 1214. Similarly, upon modifying the adjustment rate at process block 1208, the processor 200 proceeds to process block 1210 and modifies the output at process block 1212 or 1214 using the modified adjustment rate (e.g. the first minimum rate).

In response to determining that the current PWM output is not less than the first output value, the processor 200 determines whether the current PWM output is less than a second output value at process block 1216. In some embodiments, the second output value is approximately 1.5625% of full output. However, second output values of more than 1.5625% and less than 1.5625% are also contemplated. In response to determining that the current PWM output is less than the second output value, the processor 200 then determines if the PWM adjustment rate is greater than a second minimum rate at process block 1218. In one embodiment, the second minimum rate is 0.0625% of PWM output. However, second minimum rates of more than 0.0625% and less than 0.0625% are also contemplated. In response to determining that the adjustment rate is greater than the second minimum rate, the adjustment rate is set to the second minimum adjustment rate at process block 1220. In response to determining that the adjustment rate is not greater than the second minimum rate, the processor 200 determines whether the PWM output is to be increased or decreased at process block 1210. In response to determining that the PWM output is to be increased, the PWM output is adjusted by increasing the current PWM by the adjustment rate at process block 1212. In response to determining that the PWM output is to be decreased, the PWM output is adjusted by decreasing the current PWM by the adjustment rate at process block 1214. Similarly, upon modifying the adjustment rate at process block 1220, the processor 200 proceeds to process block 1210 and modifies the output at process block 1212 or 1214 using the modified adjustment rate (e.g. the second minimum rate).

In response to determining that the current PWM output is not less than the second output value, the processor 200 determines whether the current PWM output is less than a third output value at process block 1222. In some embodiments, the third output value is approximately 2.5% of full output. However, third output values of more than 2.5% and less than 2.5% are also contemplated. In response to determining that the current PWM output is less than the third output value, the processor 200 then determines if the PWM adjustment rate is greater than a third minimum rate at process block 1224. In one embodiment, the third minimum rate is 0.09375% of PWM output. However, third minimum rates of more than 0.09375% and less than 0.09375% are also contemplated. In response to determining that the adjustment rate is greater than the third minimum rate, the adjustment rate is set to the third minimum adjustment rate at process block 1226. In response to determining that the adjustment rate is not greater than the third minimum rate, the processor 200 determines whether the PWM output is to be increased or decreased at process block 1210. In response to determining that the PWM output is to be increased, the PWM output is adjusted by increasing the current PWM by the adjustment rate at process block 1212. In response to determining that the PWM output is to be decreased, the PWM output is adjusted by decreasing the current PWM by the adjustment rate at process block 1214. Similarly, upon modifying the adjustment rate at process block 1220, the processor 200 proceeds to process block 1210 and modifies the output at process block 1212 or 1214 using the modified adjustment rate (e.g. the third minimum rate).

In response to determining that the current PWM output is not less than the third output value at process block 1222, the processor 200 determines whether the PWM output is to be increased or decreased at process block 1210. In response to determining that the PWM output is to be increased, the PWM output is adjusted by increasing the current PWM by the adjustment rate at process block 1212. In response to determining that the PWM output is to be decreased, the PWM output is adjusted by decreasing the current PWM by the adjustment rate.

Although the invention has been described with reference to certain preferred embodiments, variations exist within the spirit and scope of the invention. Various features and advantages of the invention are set forth in the claims.

The invention claimed is:

1. A method for automatically dimming a light source, the method comprising:

calculating, using an electronic processor, an average environmental brightness;

determining, using the electronic processor, a current pulse width modulation ("PWM") output level provided to the light source;

determining, using the electronic processor, a target illumination level;

determining, using the electronic processor, a PWM adjustment rate, wherein the PWM adjustment rate is based at least partially on the calculated average environmental brightness;

adjusting, using the electronic processor, the current PWM output level at the determined adjustment rate to reach the target illumination level;

determining, using the electronic processor, whether a difference between the calculated environmental brightness and the target illumination level is greater than a first predetermined illumination value;

setting, using the electronic processor, the PWM adjustment rate to a first adjustment rate value based on the difference between the calculated average environmental brightness and the target illumination level being greater than the first predetermined illumination value; and transmitting, using the electronic processor, the adjusted PWM output level to the light source;

wherein the target illumination level is determined as a function of the current PWM output level and an output mode of the light source.

2. The method of claim 1, wherein determining the PWM adjustment rate comprises:

determining, using the electronic processor, in response to the difference between the calculated average environmental brightness and the target illumination level not being greater than the first predetermined illumination value, whether the difference between the calculated average environmental brightness and the target illumination level is greater than a second predetermined illumination value, wherein the second predetermined illumination value is less than the first predetermined illumination value; and setting, using the electronic processor, the PWM adjustment rate to a second adjustment rate value based on the difference between the calculated average environmental brightness and the target illumination level being greater than the second predetermined illumination value, the second adjustment rate value being different than the first adjustment rate value.

3. The method of claim 2, wherein the second adjustment rate value is a lower rate of change than the first adjustment rate value.

4. The method of claim 3, wherein determining the PWM adjustment rate further comprises:

determining, using the electronic processor, in response to the difference between the calculated average environmental brightness and the target illumination level not being greater than the second predetermined illumination value, whether the difference between the calculated average environmental brightness and the target illumination level is greater than a third predetermined illumination value, wherein the third predetermined illumination value is less than the second predetermined illumination value;

setting, using the electronic processor, the PWM adjustment rate to a third adjustment rate value based on the difference between the calculated average environmental brightness and the target illumination level being greater than the third predetermined illumination value, wherein the third adjustment rate value is a lower rate of change than the second adjustment rate value;

determining, using the electronic processor, in response to the difference between the calculated average environmental brightness and the target illumination level not being greater than the third predetermined illumination value, whether the difference between the calculated average environmental brightness and the target illumination level is greater than a fourth predetermined illumination value, wherein the fourth predetermined illumination value is less than the third predetermined illumination value; and setting, using the electronic processor, the PWM adjustment rate to a fourth adjustment rate value based on the difference between the calculated average environmental brightness and the target illumination level being greater than the fourth predetermined illumination value, wherein the fourth adjustment rate value is a lower rate of change than the third adjustment rate value.

5. The method of claim 4, wherein determining the PWM adjustment rate further comprises:

determining, using the electronic processor, in response to the difference between the calculated average environmental brightness and the target illumination level not being greater than the fourth predetermined illumination value, whether the difference between the calculated average environmental brightness and the target illumination level is greater than a fifth predetermined illumination value, wherein the fifth predetermined illumination value is less than the fourth predetermined illumination value; and setting, using the electronic processor, the PWM adjustment rate to a fifth adjustment rate value based on the difference between the calculated average environmental brightness and the target illumination level being greater than the fifth predetermined illumination value, wherein the fifth adjustment rate value is a lower rate of change than the fourth adjustment rate value.

6. The method of claim 1, wherein the light source includes one or more light emitting diodes (LEDs).

7. The method of claim 1, wherein calculating the average environmental brightness comprises:

measuring an environmental brightness level using a light sensor;

sampling, using the electronic processor, the measured environmental brightness level;

storing, in a memory coupled to the electronic processor, the sampled environmental brightness level in an array;

recording a position of the sampled environmental brightness level in the array as a first position;

determining, using the electronic processor, a first peak data value within the array, wherein the first peak data value occurred prior to the sampled environmental brightness level; and recording, using the electronic processor, a position of the determined first peak data value in the array as a second position.

8. The method of claim 7, wherein calculating the average environmental brightness further comprises:

determining, using the electronic processor, a second peak data value within the array, wherein the second peak data value occurred prior to the first peak data value;

recording, using the electronic processor, a position of the determined second peak data value in the array as a third position;

determining, using the electronic processor, a third peak data value within the array, wherein the third peak data value occurred prior to the second peak data value; and recording, using the electronic processor, a position of the determined third peak data value in the array as a fourth position.

9. The method of claim 8, wherein calculating the average environmental brightness further comprises:

determining, using the electronic processor, whether the number of sampled data points between the first position and the second position is greater than a first number of sampled data points;

calculating, using the electronic processor, the average environmental brightness using a first set of sampling data elements based on determining that the number of sampled data points between the first position and the second position is greater than the first number of sampled data points;

determining, using the electronic processor, based on the number of sampled data points between the first position and the second position not being greater than the first number of sampled data points, whether the number of sampled data points between the second position and the third position is within a range bounded by the first number of sampled data points and a second number of sampled data points, wherein the second number of sampled data points is less than the first number of sampled data points; and calculating, using the electronic processor, the average environmental brightness using a second set of sampling data elements based on the number of sampled data points between the second position and the third position not being within a range bounded by the first number of sampled data points and the second number of sampled data points.

10. The method of claim 9, wherein calculating the average environmental brightness further comprises:

determining, using the electronic processor, based on the number of sampled data points between the second position and the third position being within a range bounded by the first number of sampled data points and the second number of sampled data points, whether the number of sampled data points between the fourth position and the third position is within a range bounded by the first number of sampled data points and a third number of sampled data points, wherein the third number of sampled data points is less than the second number of sampled data points;

calculating, using the electronic processor, the average environmental brightness using a third set of sampling data elements based on the number of sampled data points between the fourth position and the third position being within the range bounded by the first number of sampled data points and the third number of sampled data points; and calculating, using the electronic processor, the average environmental brightness using a fourth set of sampling data elements based on the number of sampled data points between the third position and the fourth position not being within the range bounded by the first number of sampled data points and the third number of sampled data points.

11. The method of claim 10, wherein the third set of sampling data elements comprises all data elements in the array between the second position and the fourth position.

12. The method of claim 10, wherein the fourth set of sampling data elements comprises all data elements in the array between the second position and the third position.

13. The method of claim 9, wherein the first set of sampling data elements comprises 16 data elements immediately sampled prior to the sampled environmental brightness level.

14. The method of claim 9, wherein the second set of sampling data elements comprises 64 data elements immediately sampled prior to the sampled environmental brightness level.

15. A lighting device, the lighting device comprising:

one or more lighting elements;

an ambient light sensor; and an electronic processor in communication with a memory, wherein the electronic processor is configured to:

calculate an average environmental brightness, determine a current pulse width modulation (PWM) output level provided to the one or more lighting elements, determine a target illumination level, determine a PWM adjustment rate, wherein the PWM adjustment rate is based at least partially on the calculated average environmental brightness, adjust the current PWM output level at the determined PWM adjustment rate to reach the target illumination level, and transmit the adjusted PWM output level to the one or more lighting elements based on the target illumination level to control an output of the one or more lighting elements;

wherein the target illumination level is determined as a function of the current PWM output level and an output mode of the one or more lighting elements; and wherein calculating the average environmental brightness comprises:

measuring an environmental brightness level using a light sensor;

sampling, using the electronic processor, the measured environmental brightness level;

storing, in a memory coupled to the electronic processor, the sampled environmental level in an array;

recording a position of the sampled environmental brightness level in the array as a first position;

determining, using the electronic processor, a first peak data value within the array, wherein the first peak data value occurred prior to the sampled environmental brightness level; and recording, using the electronic processor, a position of the determined first peak data value in the array as a second position.

16. The lighting device of claim 15, wherein the electronic processor is further configured to:

determining whether a difference between the calculated average environmental brightness and the target illumination level is greater than a first predetermined illumination value;

set the PWM adjustment rate to a first adjustment rate value based on the difference between the calculated average environmental brightness and the target illumination level being greater than the first predetermined illumination value;

determine, in response to the difference between the calculated average environmental brightness and the target illumination level not being greater than the first predetermined illumination value, whether the difference between the calculated average environmental brightness and the target illumination level is greater than a second predetermined illumination value, wherein the second predetermined illumination value is less than the first predetermined illumination value; and set the PWM adjustment rate to a second adjustment rate value based on the difference between the calculated average environmental brightness and the target illumination level being greater than the second predetermined illumination value, the second adjustment rate value being different than the first adjustment rate value.

17. The lighting device of claim 15, further comprising:

an automatic dimming mode selector switch configured to allow a user to provide an input to the electronic processor to maintain a constant lighting level regardless of the average environmental brightness.

18. The lighting device of claim 15, wherein the lighting device is a headlamp.

19. A method for automatically dimming a light source based on an environmental lighting level, the method comprising:

calculating, using an electronic processor, an average environmental brightness;

determining, using the electronic processor, a current pulse width modulation ("PWM") output level provided to the light source;

determining, using the electronic processor, a target illumination level;

determining, using the electronic processor, a PWM adjustment rate, wherein determining the PWM adjustment rate comprises:

determining, using the electronic processor, whether a difference between the calculated average environmental brightness and the target illumination level is greater than a first predetermined illumination value, setting, using the electronic processor, the PWM adjustment rate to a first adjustment rate value based on the difference between the calculated average environmental brightness and the target illumination level being greater than the first predetermined illumination value, determining, using the electronic processor, in response to the difference between the calculated average environmental brightness and the target illumination level not being greater than the first predetermined illumination value, whether the difference between the calculated average environmental brightness and the target illumination level is greater than a second predetermined illumination value, wherein the second predetermined illumination value is less than the first predetermined illumination value, and setting, using the electronic processor, the PWM adjustment rate to a second adjustment rate value based on the difference between the calculated average environmental brightness and the target illumination level being greater than the second predetermined illumination value, the second adjustment rate value being different than the first adjustment rate value;

adjusting, using the electronic processor, the current PWM output level at the determined PWM adjustment rate to reach the target illumination level; and transmitting, using the electronic processor, the adjusted PWM output level to one or more lighting elements of the light source to control an output of the one or more lighting elements.

20. The method of claim 19, wherein determining the PWM adjustment rate further comprises:

determining, using the electronic processor, in response to the difference between the calculated average environmental brightness and the target illumination level not being greater than the second predetermined illumination value, whether the difference between the calculated average environmental brightness and the target illumination level is greater than a third predetermined illumination value, wherein the third predetermined illumination value is less than the second predetermined illumination value;

setting, using the electronic processor, the PWM adjustment rate to a third adjustment rate value based on the difference between the calculated average environmental brightness and the target illumination level being greater than the third predetermined illumination value, wherein the third adjustment rate value is a lower rate of change than the second adjustment rate value;

determining, using the electronic processor, in response to the difference between the calculated average environmental brightness and the target illumination level not being greater than the third predetermined illumination value, whether the difference between the calculated average environmental brightness and the target illumination level is greater than a fourth predetermined illumination value, wherein the fourth predetermined illumination value is less than the third predetermined illumination value; and setting, using the electronic processor, the PWM adjustment rate to a fourth adjustment rate value based on the difference between the calculated average environmental brightness and the target illumination level being greater than the fourth predetermined illumination value, wherein the fourth adjustment rate value is a lower rate of change than the third adjustment rate value.

21. A method for automatically dimming a light source, the method comprising:

calculating, using an electronic processor, an average environmental brightness;

determining, using the electronic processor, a current pulse width modulation ("PWM") output level provided to the light source;

determining, using the electronic processor, a target illumination level;

determining, using the electronic processor, a PWM adjustment rate, wherein the PWM adjustment rate is based at least partially on the calculated average environmental brightness;

adjusting, using the electronic processor, the current PWM output level at the determined adjustment rate to reach the target illumination level; and transmitting, using the electronic processor, the adjusted PWM output level to the light source;

wherein the target illumination level is determined as a function of the current PWM output level and an output mode of the light source, and wherein calculating the average environmental brightness comprises:

measuring an environmental brightness level using a light sensor;

sampling, using the electronic processor, the measured environmental brightness level;

storing, in a memory coupled to the electronic processor, the sampled environmental brightness level in an array;

recording a position of the sampled environmental brightness level in the array as a first position;

determining, using the electronic processor, a first peak data value within the array, wherein the first peak data value occurred prior to the sampled environmental brightness level; and recording, using the electronic processor, a position of the determined first peak data value in the array as a second position.

* * * * *